US012107356B2

(12) United States Patent
Little

(10) Patent No.: US 12,107,356 B2
(45) Date of Patent: Oct. 1, 2024

(54) ELECTRICAL CONNECTOR ASSEMBLY

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Terrance F. Little, Fullerton, CA (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 406 days.

(21) Appl. No.: 17/676,173

(22) Filed: Feb. 20, 2022

(65) Prior Publication Data

US 2023/0268679 A1 Aug. 24, 2023

Related U.S. Application Data

(60) Provisional application No. 63/152,060, filed on Feb. 22, 2021.

(51) Int. Cl.

| | |
|---|---|
| ***H01R 12/71*** | (2011.01) |
| ***H01R 12/58*** | (2011.01) |
| ***H01R 13/41*** | (2006.01) |
| ***H01R 13/652*** | (2006.01) |

(52) U.S. Cl.

CPC ........... *H01R 12/71* (2013.01); *H01R 12/585* (2013.01); *H01R 13/41* (2013.01); *H01R 13/652* (2013.01)

(58) Field of Classification Search

CPC ...... H01R 12/71; H01R 12/585; H01R 12/72; H01R 12/724; H01R 12/727; H01R 13/652; H01R 13/41; H01R 13/6592; H01R 23/662; H01R 27/00

USPC .......................................... 439/95, 497, 630

See application file for complete search history.

(56) References Cited

U.S. PATENT DOCUMENTS

| | | | | |
|---|---|---|---|---|
| 9,124,009 | B2 | 9/2015 | Atkinson | |
| 10,069,262 | B2 | 9/2018 | Little | |
| 10,381,767 | B1 | 8/2019 | Milbrand, Jr. et al. | |
| 10,873,160 | B2 * | 12/2020 | Henry | H01R 12/72 |
| 11,081,821 | B2 * | 8/2021 | Blackburn | H01R 13/6587 |
| 11,189,943 | B2 * | 11/2021 | Zerebilov | G02B 6/428 |
| 11,322,894 | B2 * | 5/2022 | Little | H01R 13/405 |

(Continued)

*Primary Examiner* — Gary F Paumen

(74) *Attorney, Agent, or Firm* — Ming Chieh Chang

(57) ABSTRACT

An electrical connector assembly includes a contact module having an upper part and a lower part stacked with each other in the vertical direction. The upper part includes a front/outer upper unit and a rear/inner upper unit. The lower part includes a front/outer lower unit and a rear/inner lower unit. Each unit includes an insulative body and a plurality of contacts integrally formed with the insulative body. The insulative body includes a middle sector and a pair of side sectors. The contacts include the side-band contacts retained in the middle sector, and the differential-pair contacts retained in the side sectors. The tail sections of the side-band contacts are mounted to the printed circuit board. The tail sections of the differential-pair contacts are connected to the wires. Each of the unit further includes a metallic grounding bracket provides spaced two positions mechanically and electrically connected to each corresponding grounding contact.

20 Claims, 48 Drawing Sheets

(56) References Cited

U.S. PATENT DOCUMENTS

| | | | | |
|---|---|---|---|---|
| 11,349,262 | B2 * | 5/2022 | Chung | H01R 12/721 |
| 2019/0089106 | A1 | 3/2019 | Regnier | |
| 2020/0274267 | A1 | 8/2020 | Zerebilov et al. | |
| 2020/0358227 | A1 | 11/2020 | Henry et al. | |
| 2020/0366017 | A1 | 11/2020 | Blackburn et al. | |
| 2021/0351536 | A1 | 11/2021 | Chung et al. | |
| 2021/0351547 | A1 | 11/2021 | Little et al. | |
| 2022/0021158 | A1 | 1/2022 | Little et al. | |
| 2022/0029360 | A1 | 1/2022 | Little et al. | |
| 2022/0216635 | A1 * | 7/2022 | Little | H01R 13/514 |

* cited by examiner

ELECTRICAL CONNECTOR ASSEMBLY

CROSS REFERENCE TO RELATED APPLICATION

This application claims priority to U.S. application Ser. No. 63/152,060, filed Feb. 22, 2021, the content of which is incorporated herein by reference in its entirety.

BACKGROUND OF THE INVENTION

1. Field of the Invention

The invention relates to the electrical connector assembly, and particularly to the electrical connector assembly including the four-layer contact module each having the side-band contacts mounted to the printed circuit board and the differential-pair contacts mechanically and electrically connected to the wires. This application basically relates to U.S. provisional application 63/118,829 filed on Nov. 27, 2020. The specific feature regarding the grounding bar electrically and mechanically connecting to the corresponding grounding contacts relates to provisional application 63/134,557 filed on Jan. 6, 2021.

2. Description of Related Art

On one hand, U.S. provisional applications 63/053,611 and 63/090,225 with the same inventor of the instant application disclose the electrical connector assembly including the four-layer contact module for mounting to the printed circuit board. On the other hand, U.S. provisional application 63/022,492 also with the same inventor of the instant application discloses the electrical connector assembly having a pair of differential-pair contact zones commonly sandwich a side-band contact zone therebetween in the transverse direction wherein the side-band contacts are directly mounted to the printed circuit board while the differential-pair contacts are mechanically and electrically connected to the corresponding wires.

SUMMARY OF THE INVENTION

Therefore, the instant invention is to provide a hybrid type electrical connector assembly essentially composed of the four-layer contact module with different contact zones in the transverse direction for respectively connecting to the printed circuit board and the wires. The electrical connector includes an insulative housing for mounting to the printed circuit board, and a contact module received within the insulative housing. The contact module includes an upper part and a lower part stacked with each other in the vertical direction. The upper part includes a front/outer upper unit and a rear/inner upper unit. The lower part includes a front/outer lower unit and a rear/inner lower unit. Each unit includes an insulative body and a plurality of contacts integrally formed with the insulative body via an insert-molding process. The insulative body includes a middle sector and a pair of side sectors. The contacts include the side-band contacts retained in the middle sector, and the differential-pair contacts retained in the side sectors. The side sector forms a plurality of grooves to receive the tail sections of the differential-pair contacts and the corresponding wires which are soldered to the tail sections of the differential-pair contacts. The insulative body further forms the coupling structures so as to be engaged with those of the neighboring unit. Each unit further includes a pair of grounding brackets each cooperating with a transverse bar of the corresponding grounding contacts to sandwich the corresponding wires therebetween in the vertical direction. A pair of metallic shields commonly enclose the contact module therein. Compared to the aforementioned provisional application 63/118,829 having the grounding bracket mechanically and electrically connected to each grounding contact only at one position, in the instant invention the grounding bracket provides spaced two positions mechanically and electrically connected to each corresponding grounding contact. Moreover, the grounding bracket further includes an extending tang to extend through the metal shell and an additional side plate so as to securely assemble the whole contact module together.

Other advantages and novel features of the invention will become more apparent from the following detailed description of the present embodiment when taken in conjunction with the accompanying drawings.

BRIEF DESCRIPTION OF THE DRAWINGS

FIG. 7(A)-1 is an enlarged perspective view showing how the grounding bracket is mounted upon the corresponding grounding contacts;

FIG. 18-1 is an enlarged perspective view of a portion of the front/outer upper unit of the upper part of the contact module of the electrical connector assembly of FIG. 18;

FIG. 19-1 is an enlarged perspective view of a portion of the front/outer lower unit of the lower part of the contact module of the electrical connector assembly of FIG. 19;

DETAILED DESCRIPTION OF THE PREFERRED EMBODIMENT

Figure 1A:
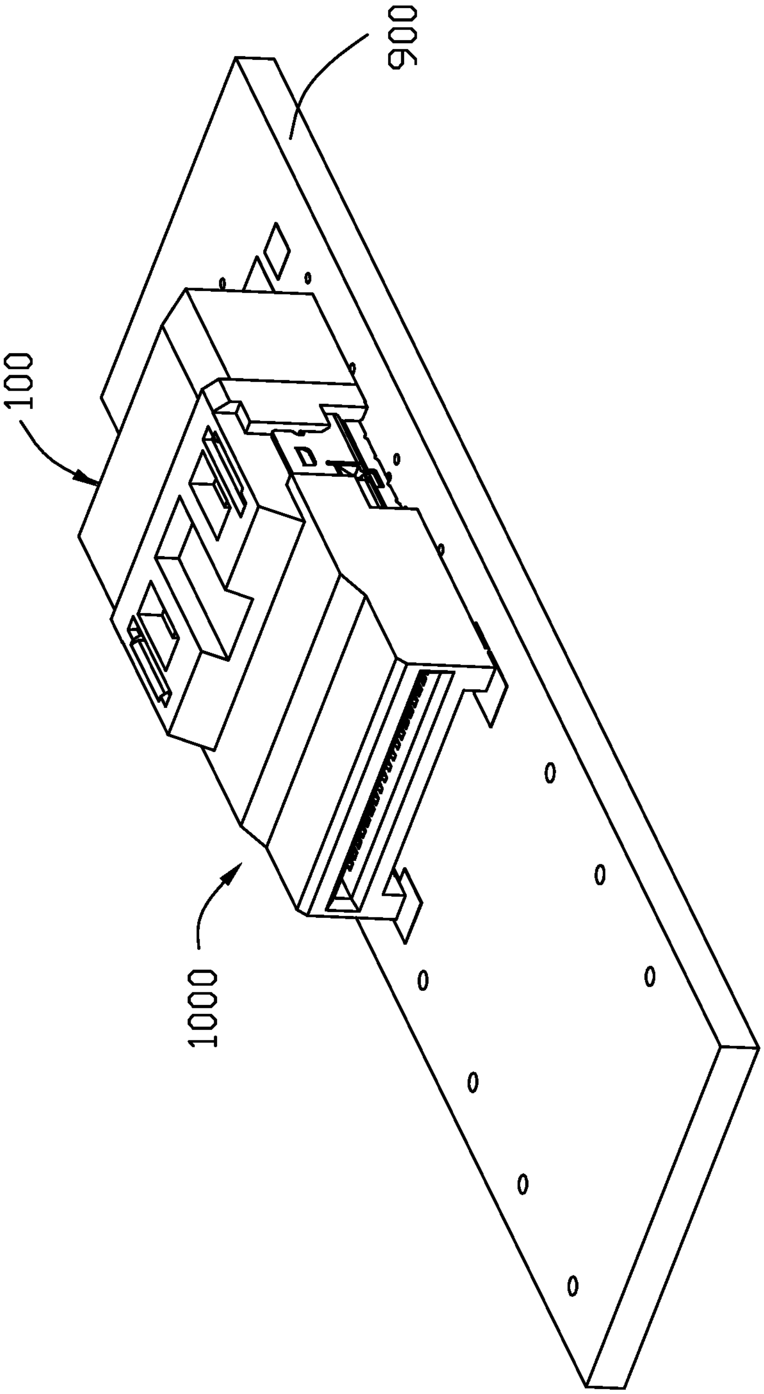
FIG. 1(A) is a perspective view of an electrical connector assembly mounted upon a printed circuit board according to the first embodiment of the invention.
Figure 1B:
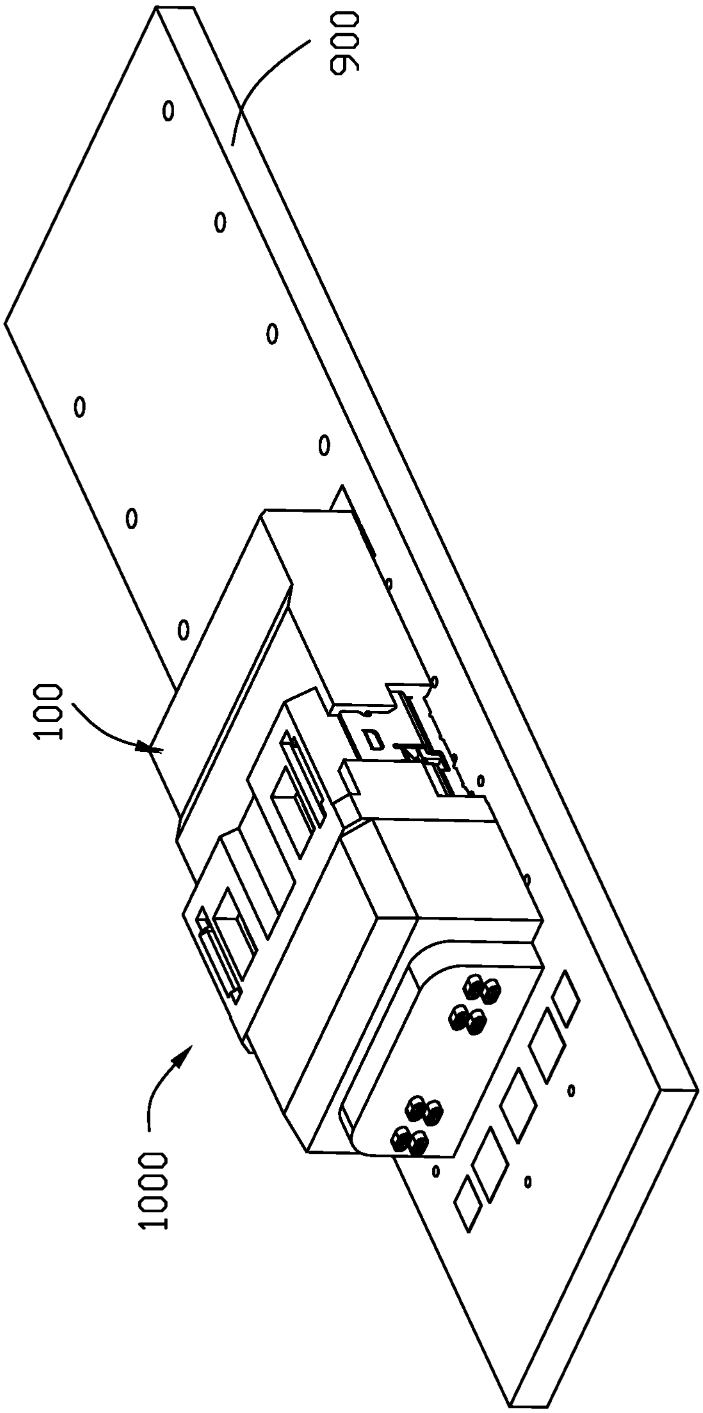
FIG. 1 (B) is another perspective view of the electrical connector assembly upon the printed circuit board of FIG. 1(A)
Figure 2A:
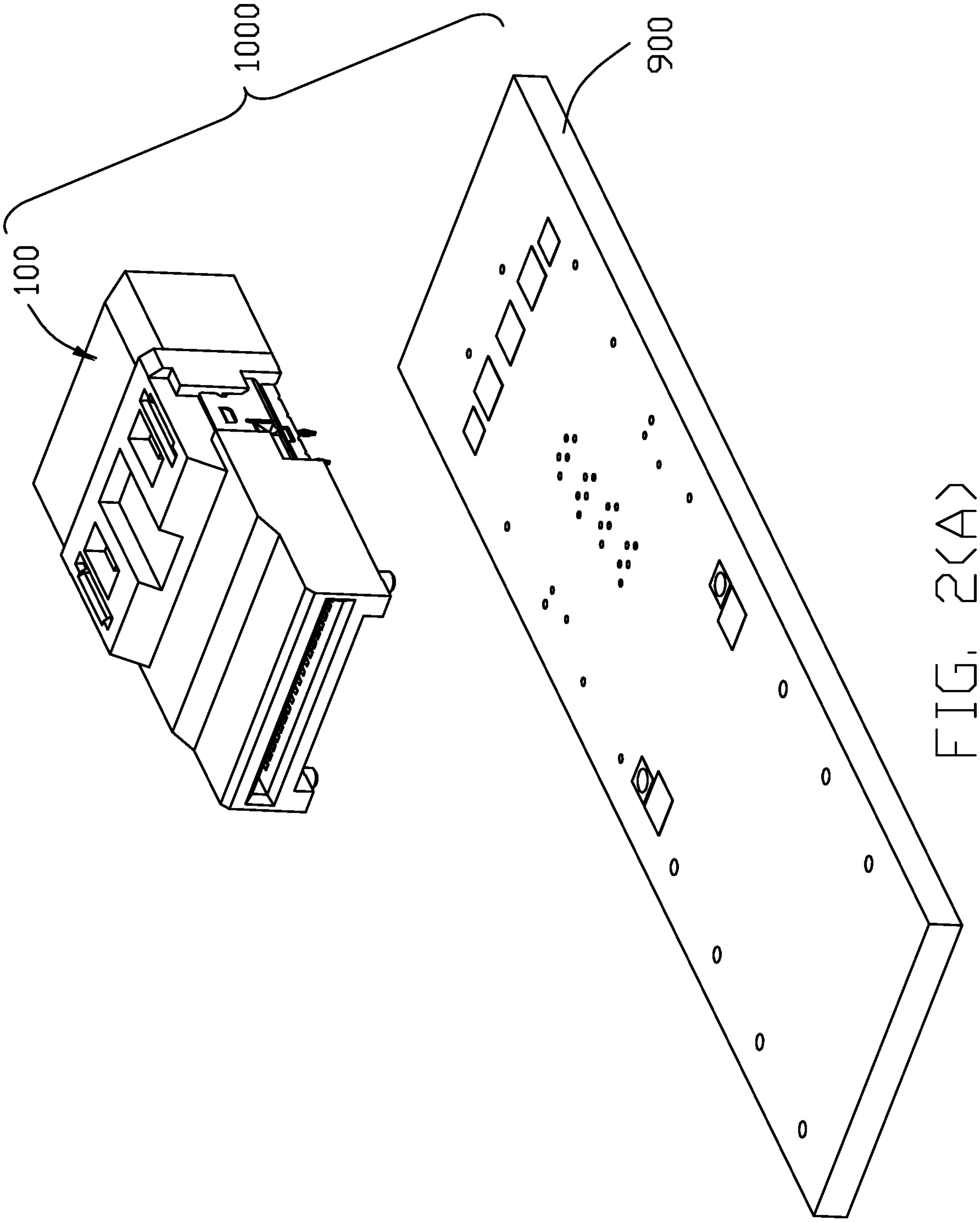
FIG. 2(A) is an exploded perspective view of the electrical connector assembly removed away from the printed circuit board of FIG. 1(A)
Figure 2B:
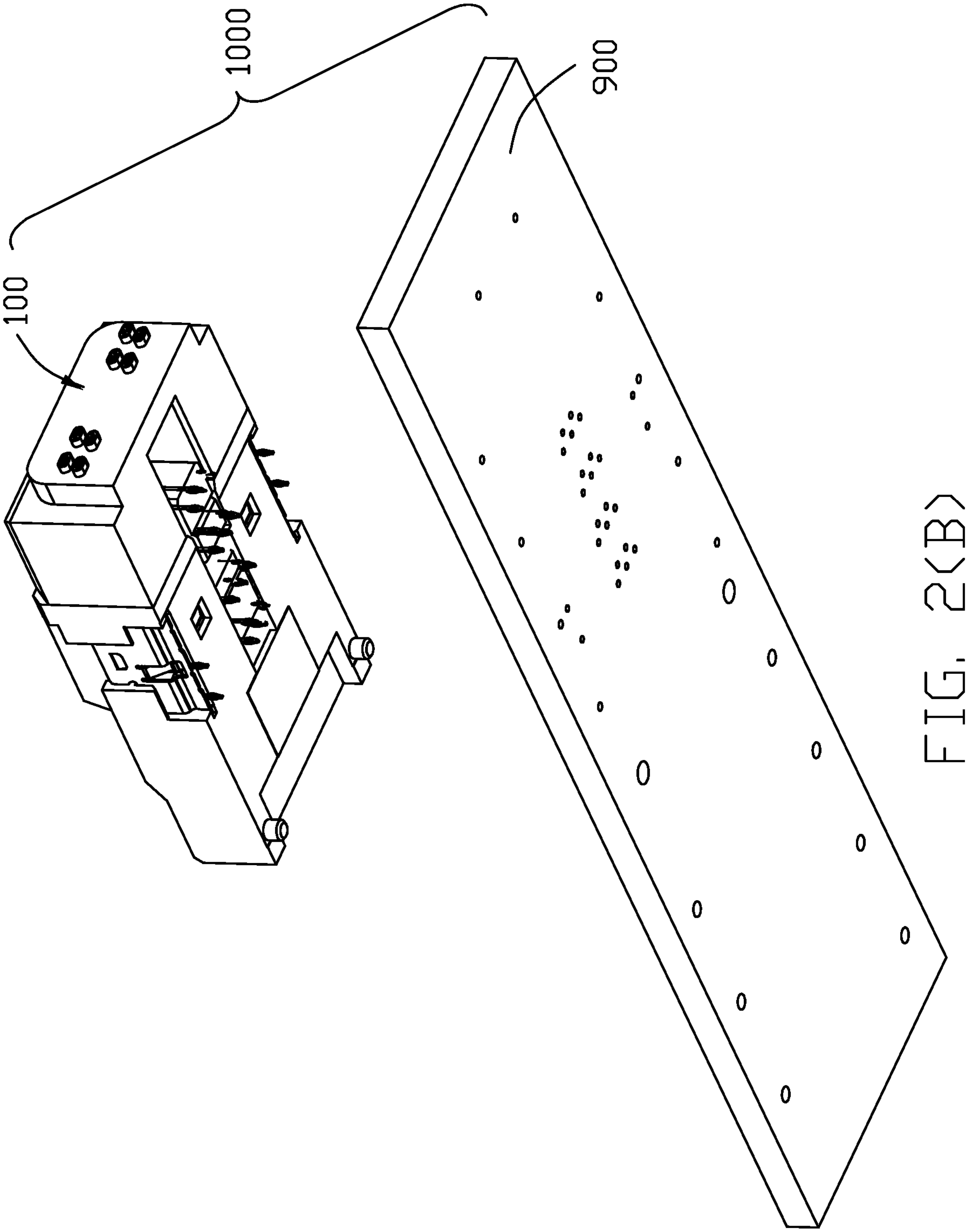
FIG. 2(B) is another exploded perspective view of the electrical connector assembly removed way from the printed circuit board of FIG. 1(A)
Figure 3A:
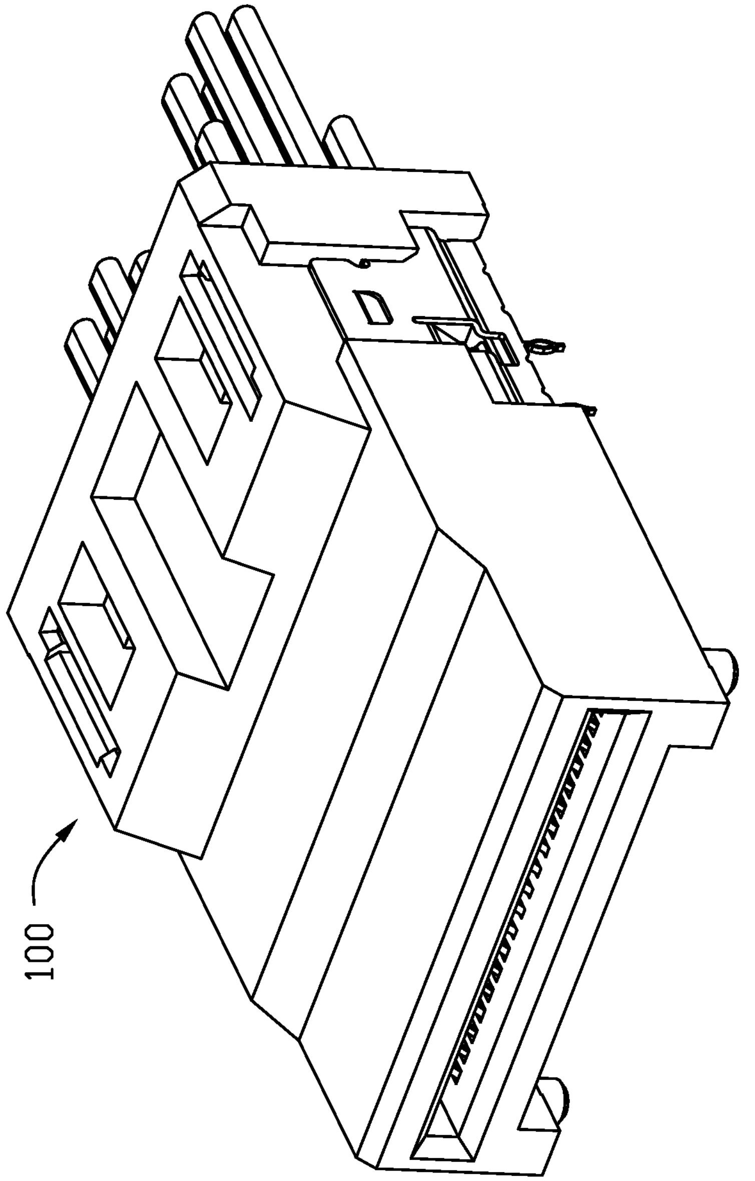
FIG. 3(A) is a perspective view of the electrical connector assembly of FIG. 1(A) without showing the over-molded cover.
Figure 3B:
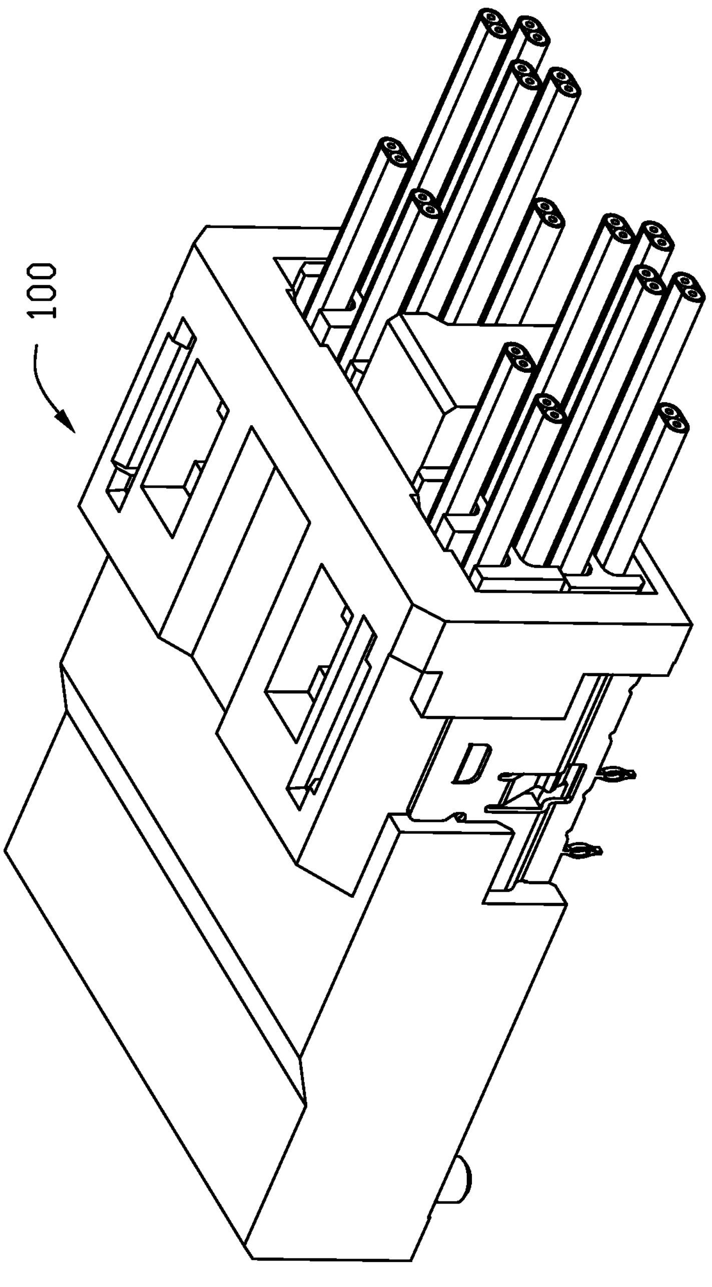
FIG. 3(B) is another perspective view of the electrical connector assembly of FIG. 3(A)
Figure 3C:
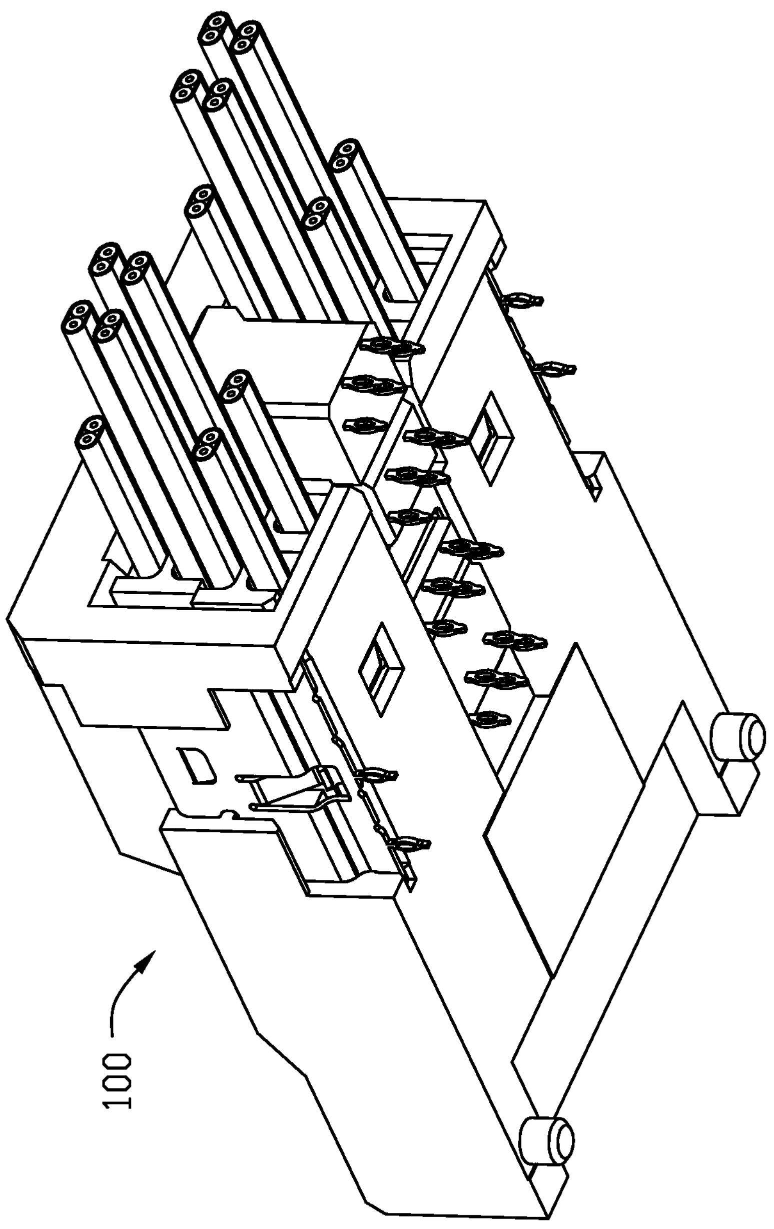
FIG. 3(C) is another perspective view of the electrical connector assembly of FIG. 3(A)
Figure 4:
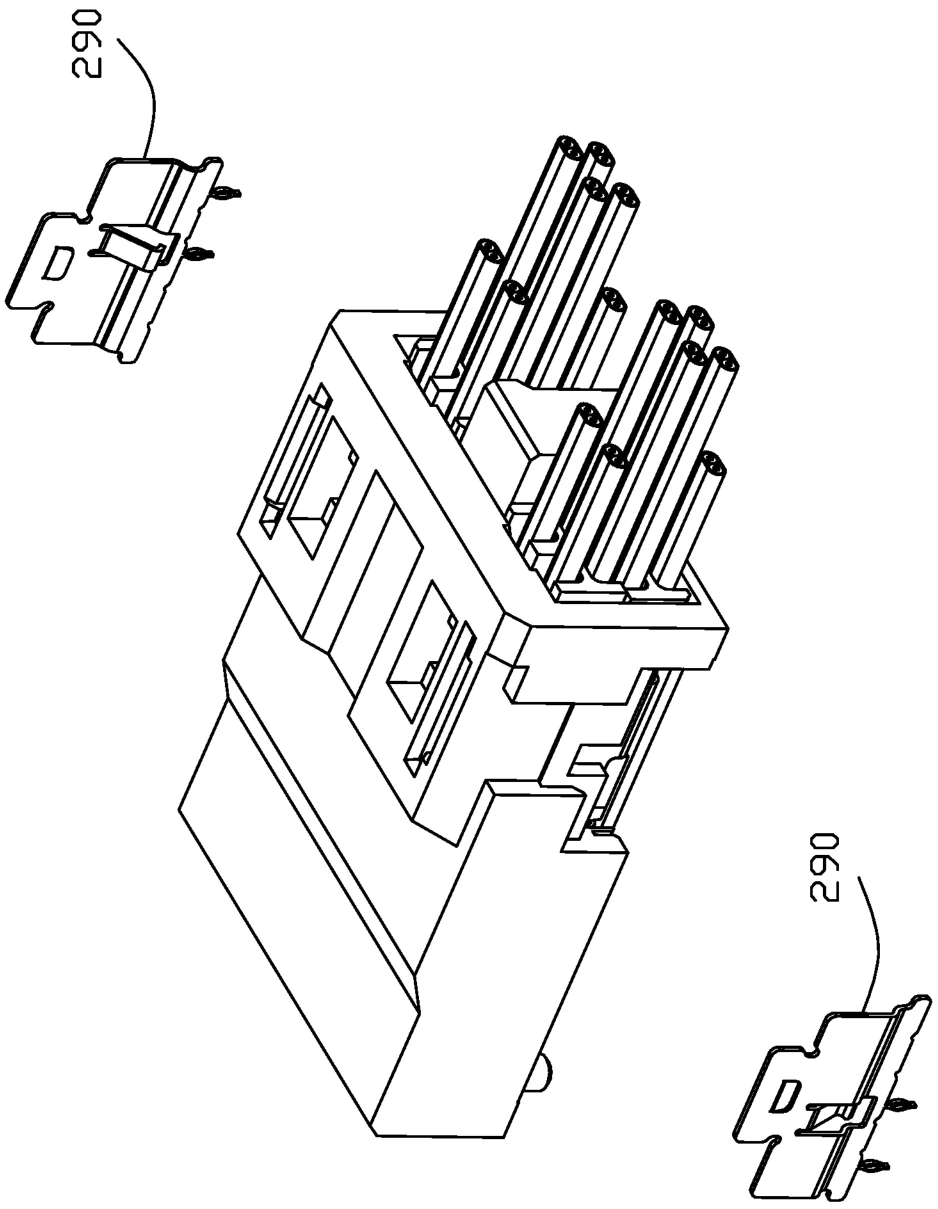
FIG. 4 is an exploded perspective view of the electrical connector assembly of FIG. 3(A) wherein the mounting legs are removed from the housing.
Figure 5A:
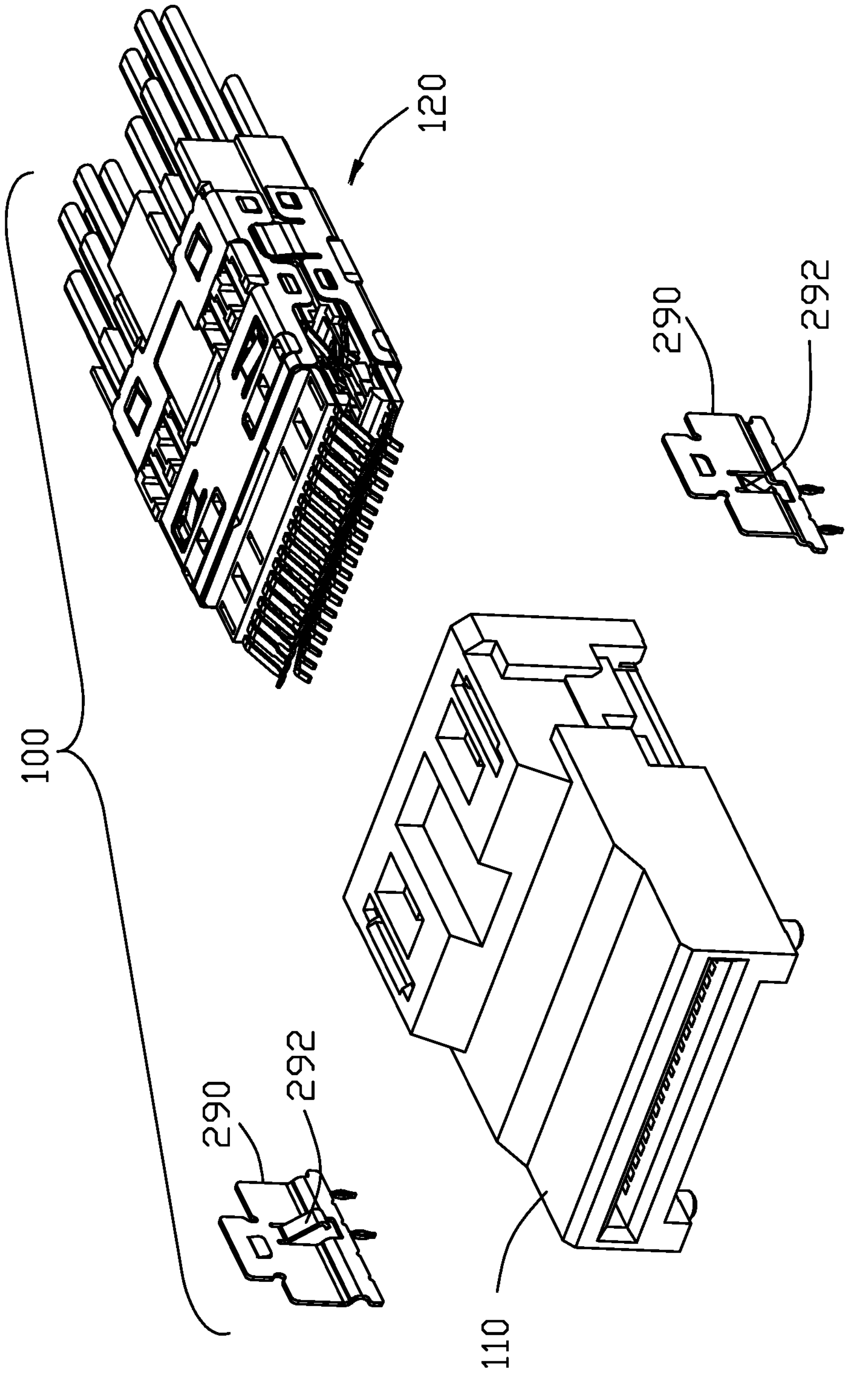
FIG. 5(A) is an exploded perspective view of the electrical connector assembly of FIG. 4 wherein the contact module is removed from the housing.
Figure 5B:
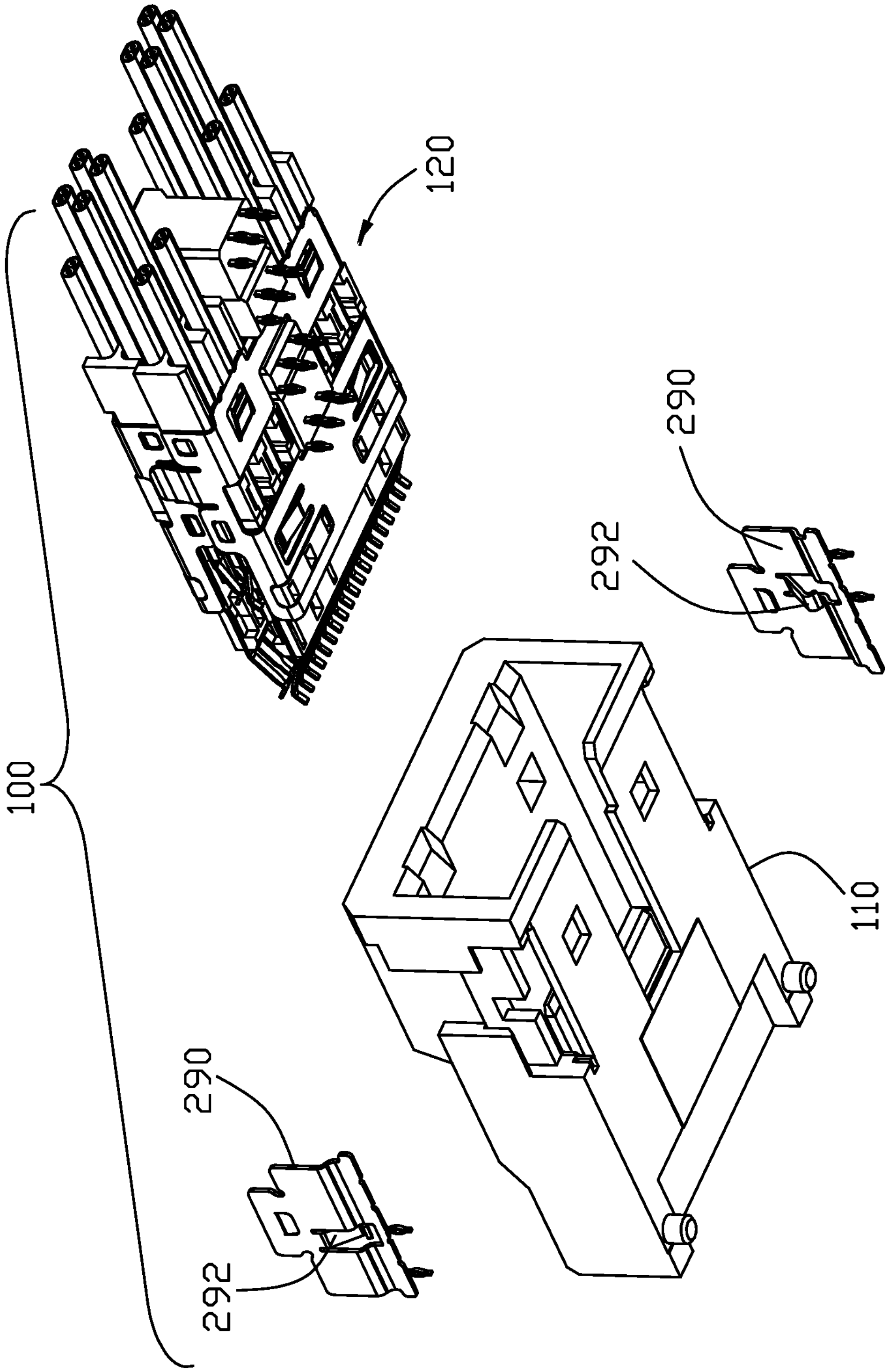
FIG. 5(B) is another exploded perspective view of the electrical connector assembly of FIG. 5(A)
Figure 6A:
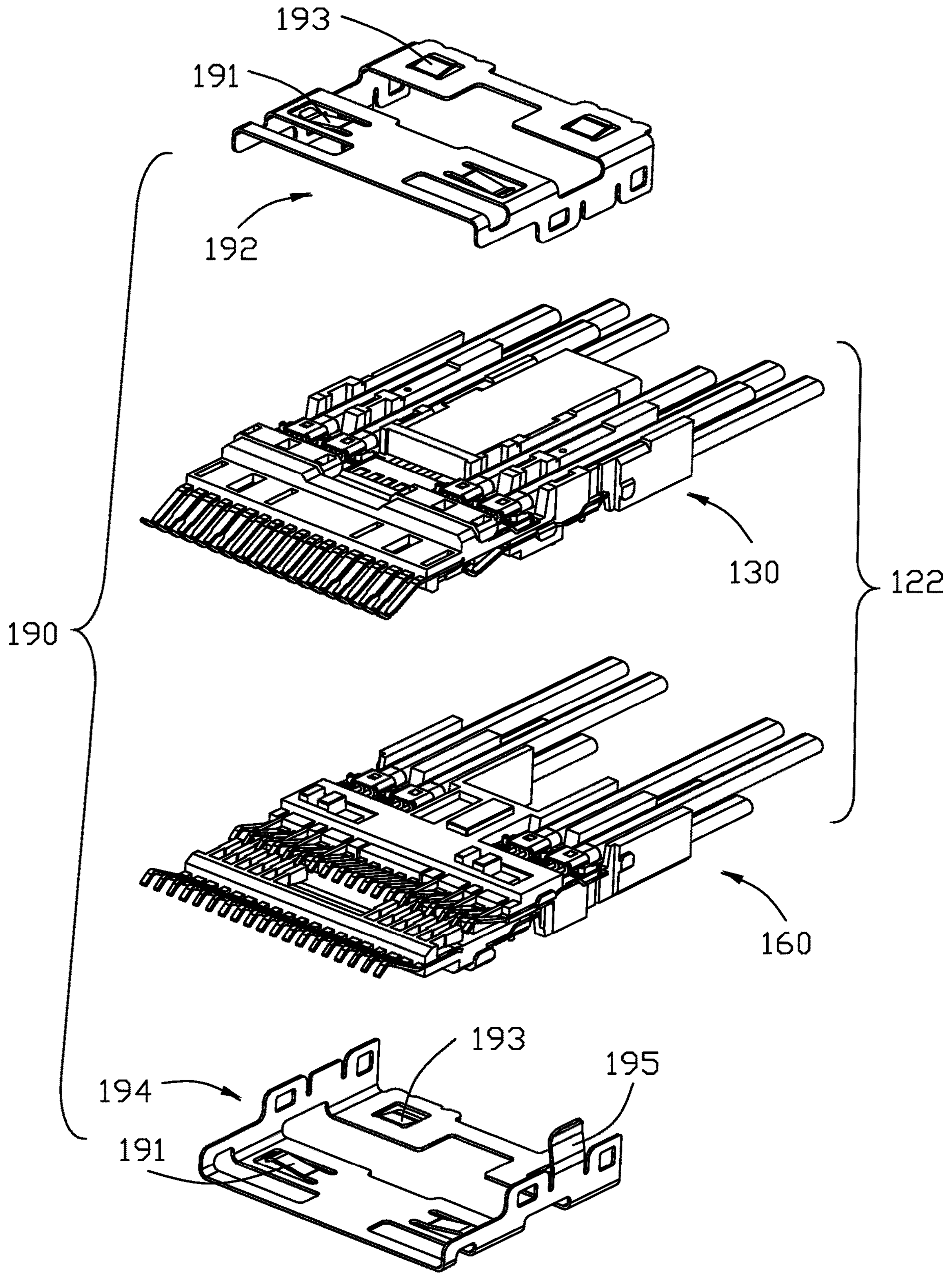
FIG. 6(A) is an exploded perspective view of the contact module of the electrical connector assembly of FIG. 5(A) wherein the metal shells are removed away from the insulators.
Figure 6B:
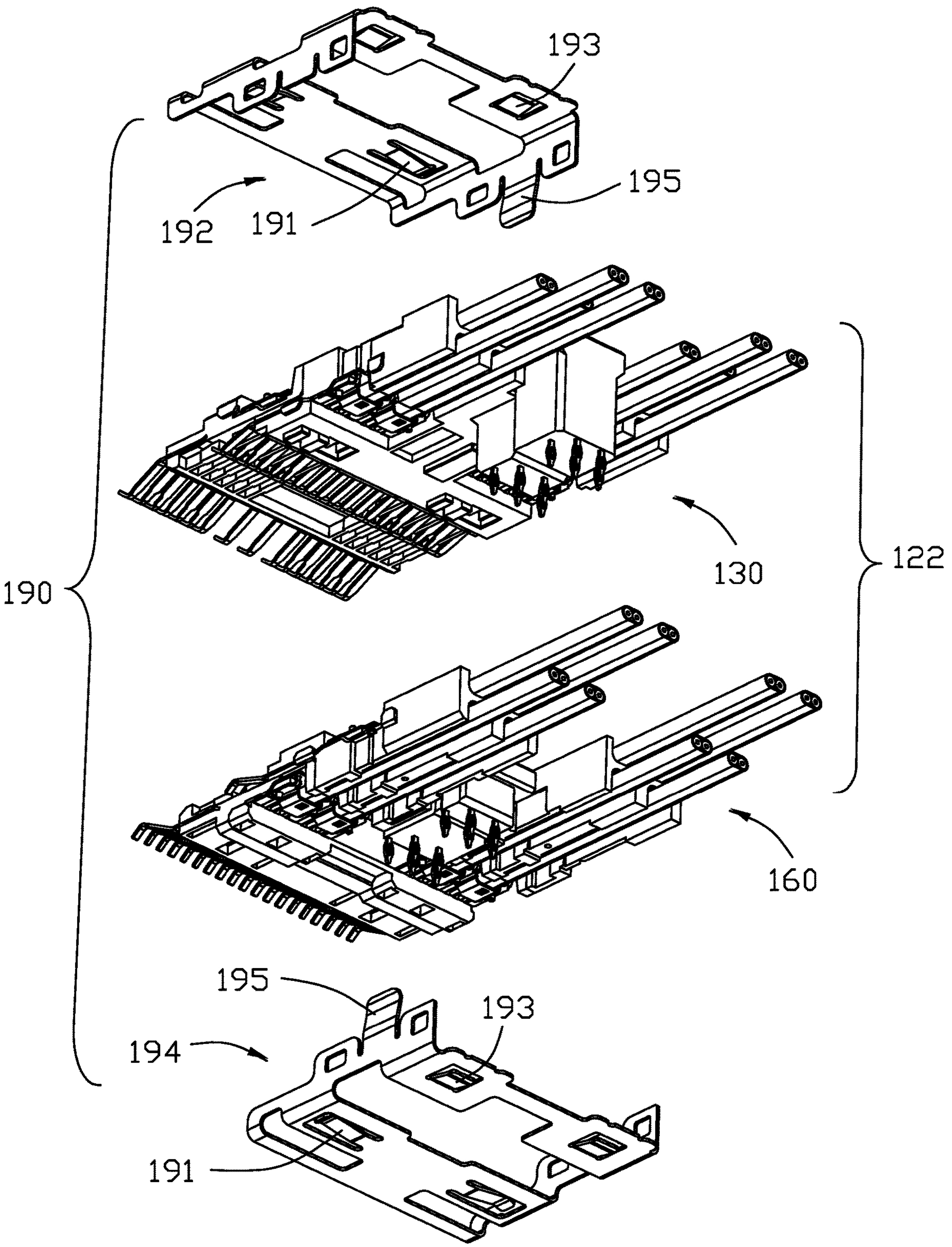
FIG. 6(B) is another exploded perspective view of the contact module of the electrical connector assembly of FIG. 6(A)
Figure 7A:
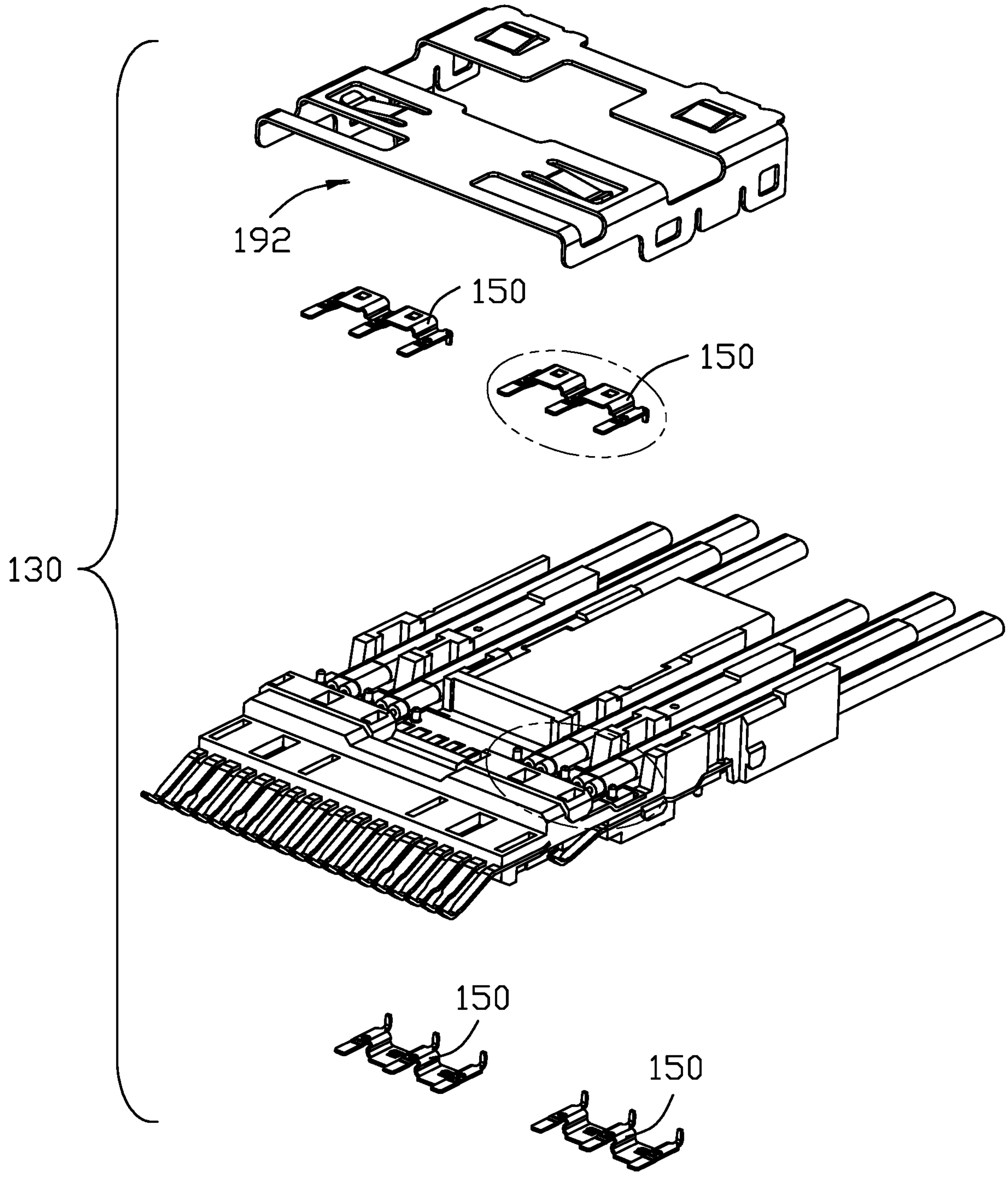
FIG. 7(A) is an exploded perspective view of the upper part of the contact module of the electrical connector assembly of FIG. 6(A)
Figures 1, 7A:
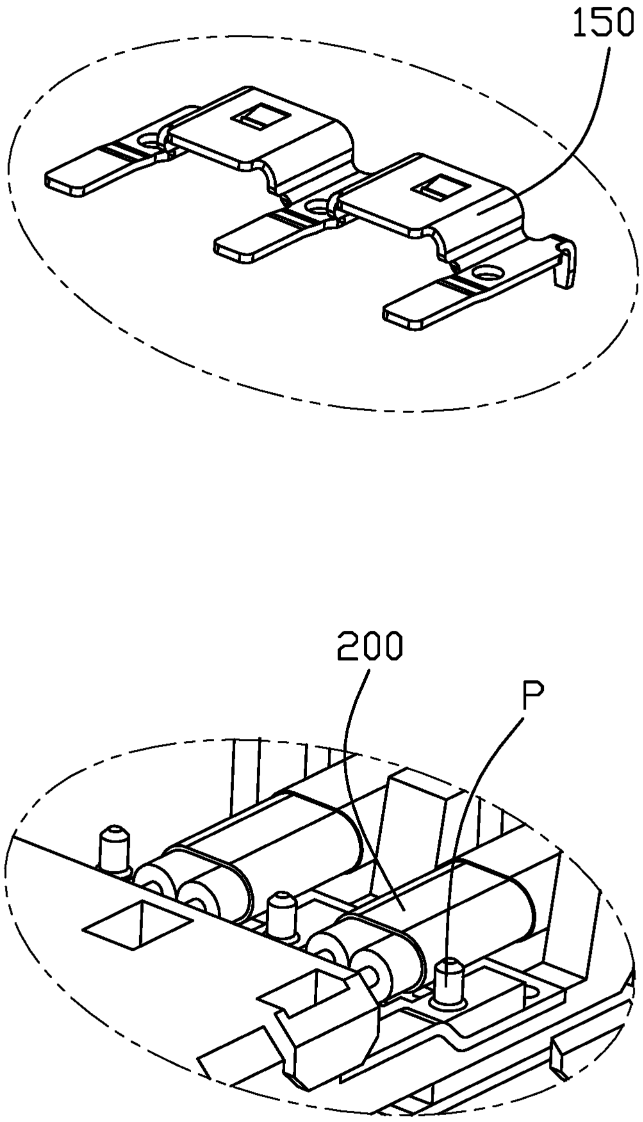
Figure 7B:
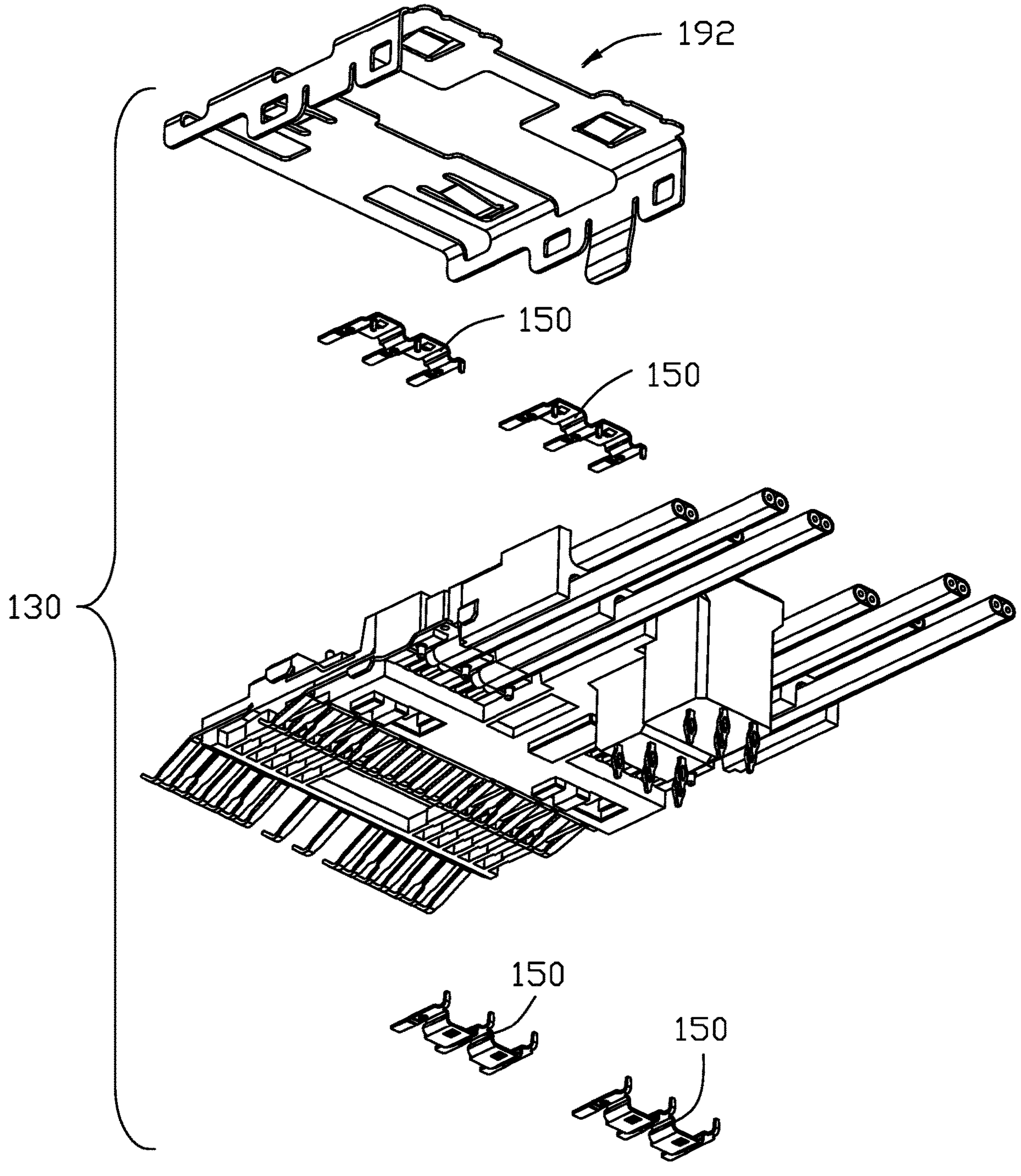
FIG. 7(B) is another exploded perspective view of the upper part of the contact module of the electrical connector assembly of FIG. 7(A)
Figure 8A:
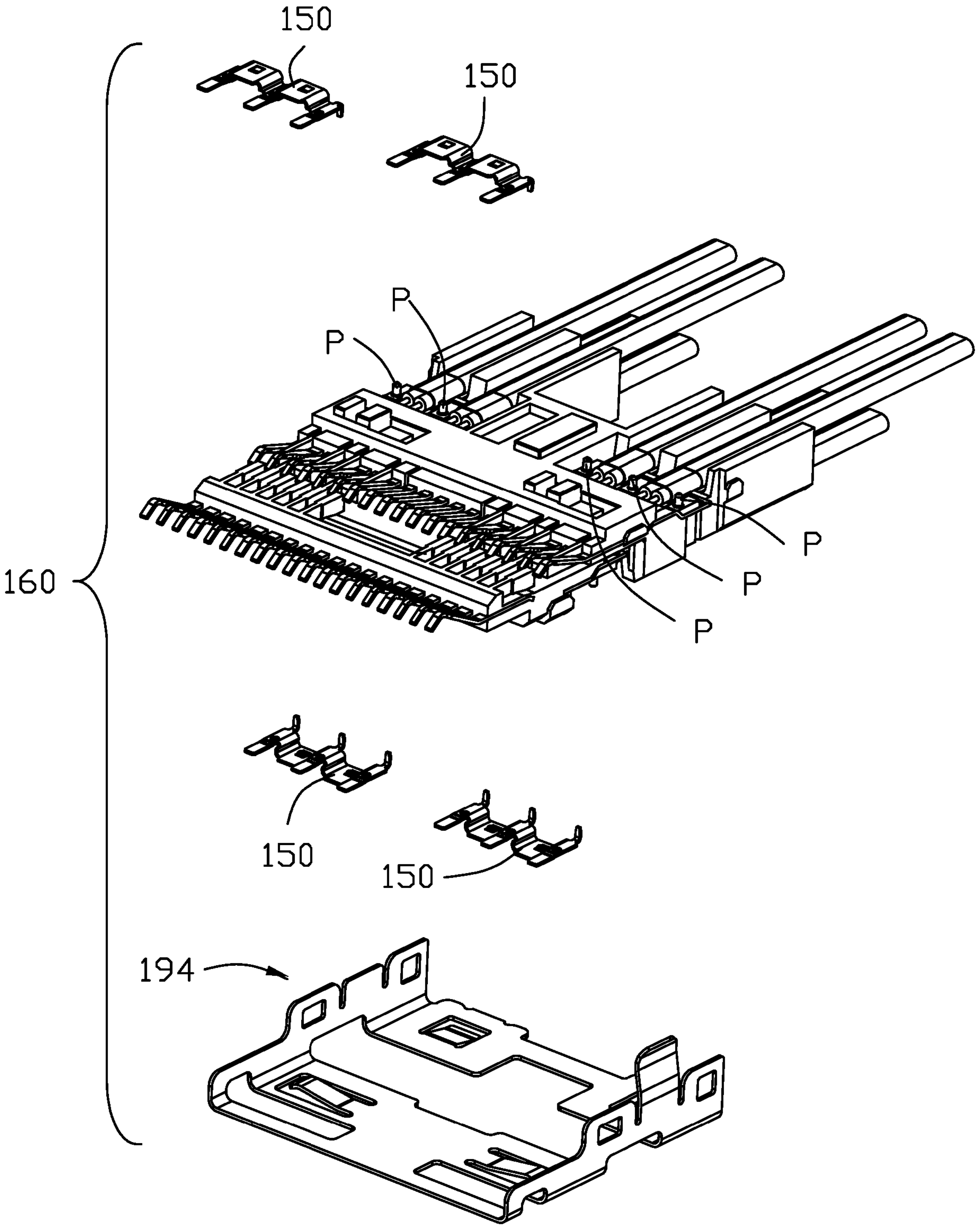
FIG. 8(A) is an exploded perspective view of the lower part of the contact module of the electrical connector assembly of FIG. 6(A)
Figure 8B:
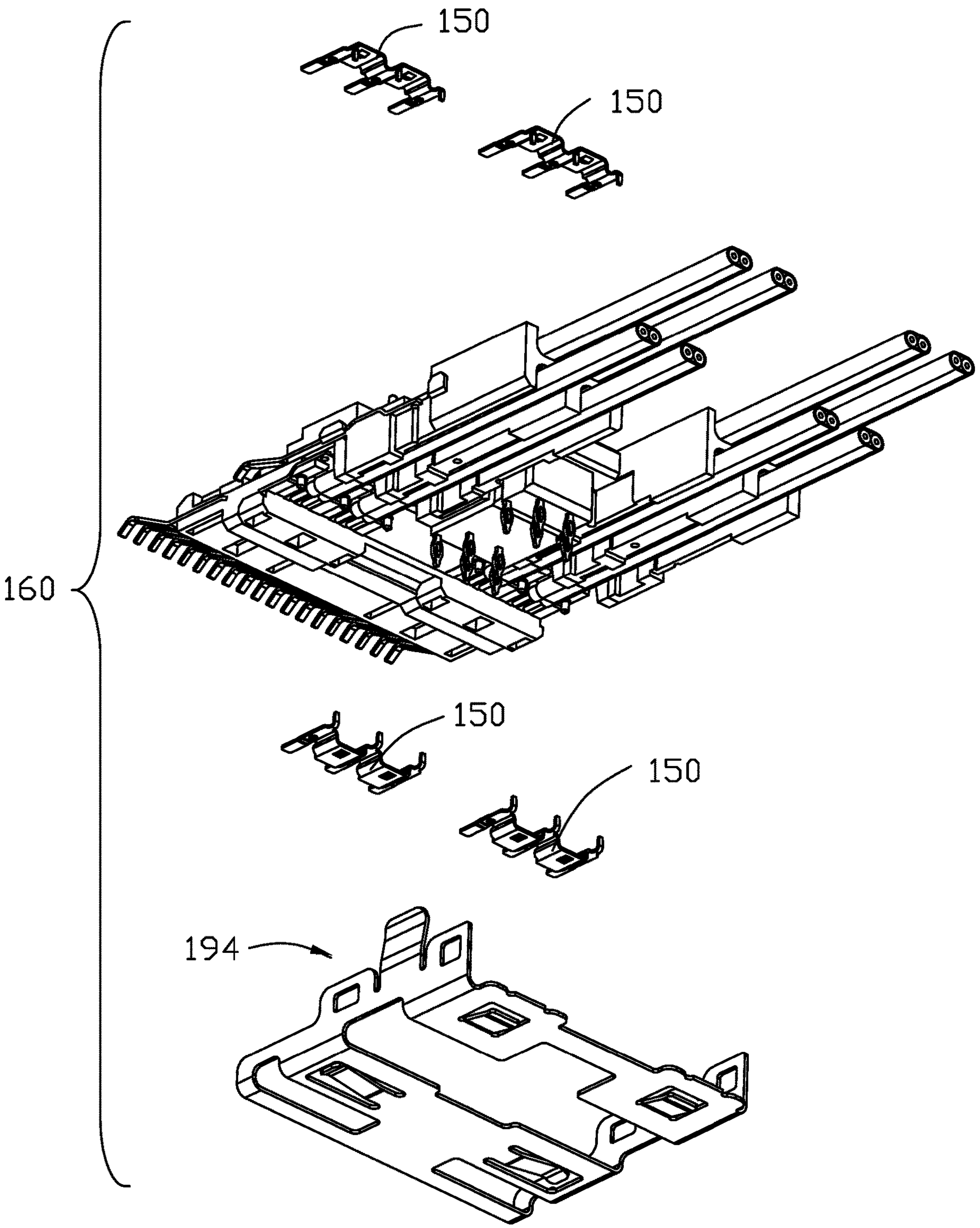
FIG. 8(B) is another exploded perspective view of the lower part of the contact module of the electrical connector assembly of FIG. 8(A)

Reference will now be made in detail to the embodiments of the present disclosure.

Referring to FIGS. 1-13(E), in a combination 1000, an electrical connector assembly 100 for mounting upon a printed circuit board (PCB) 900, includes an insulative housing 110 and a contact module assembly 120 received within the housing 110. The contact module assembly 120 includes a contact module 122 retained within a metallic shield 190. The contact module 122 includes an upper part 130 and a lower part 160 stacked with each other. The upper part 130 includes a front/outer upper unit 132 and a rear/inner upper unit 134 assembled together. The front/upper unit 132 includes a unitary insulative body 136 and a plurality of contacts 140 integrally formed within the insulative body 136 via an insert-molding process. The insulative body 136 includes a middle sector (not labeled) and a pair of side sectors (not labeled).

Figure 11A:
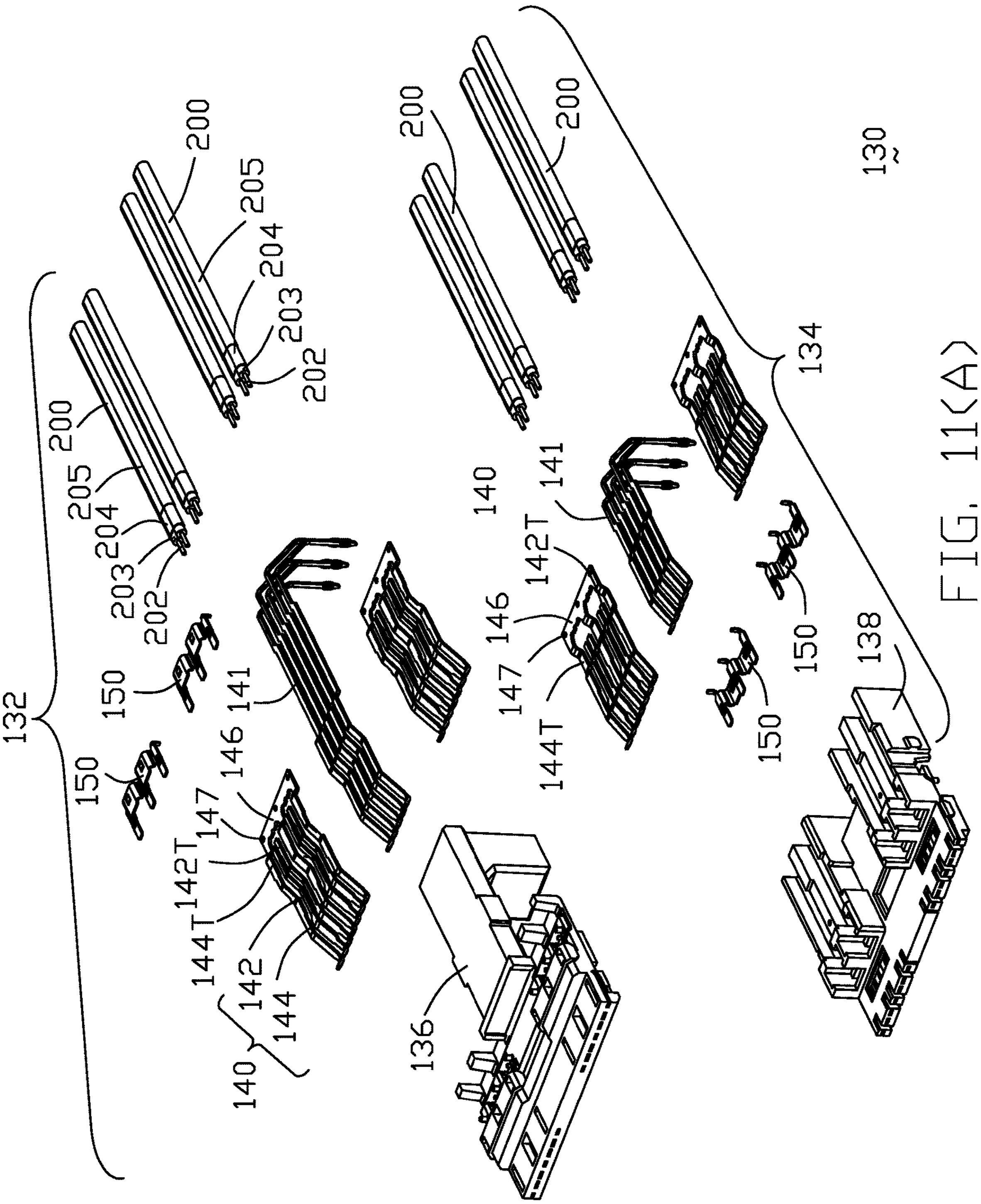
FIG. 11(A) is a further exploded perspective view of the upper part of the contact module of the electrical connector assembly of FIG. 7(A)
Figure 11B:
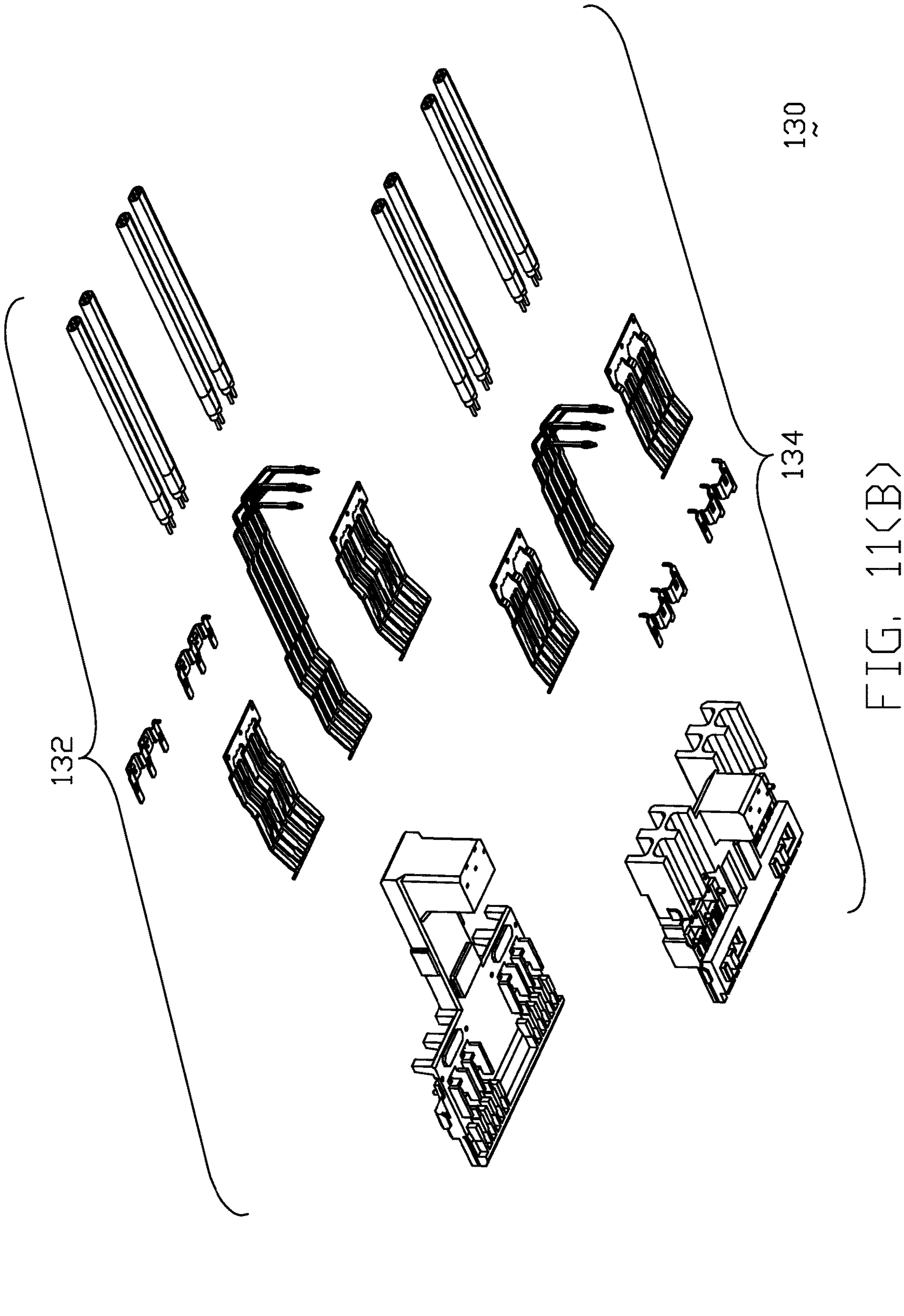
FIG. 11(B) is another exploded perspective view of the upper part of the contact module of the electrical connector assembly of FIG. 11(A)
Figure 12A:
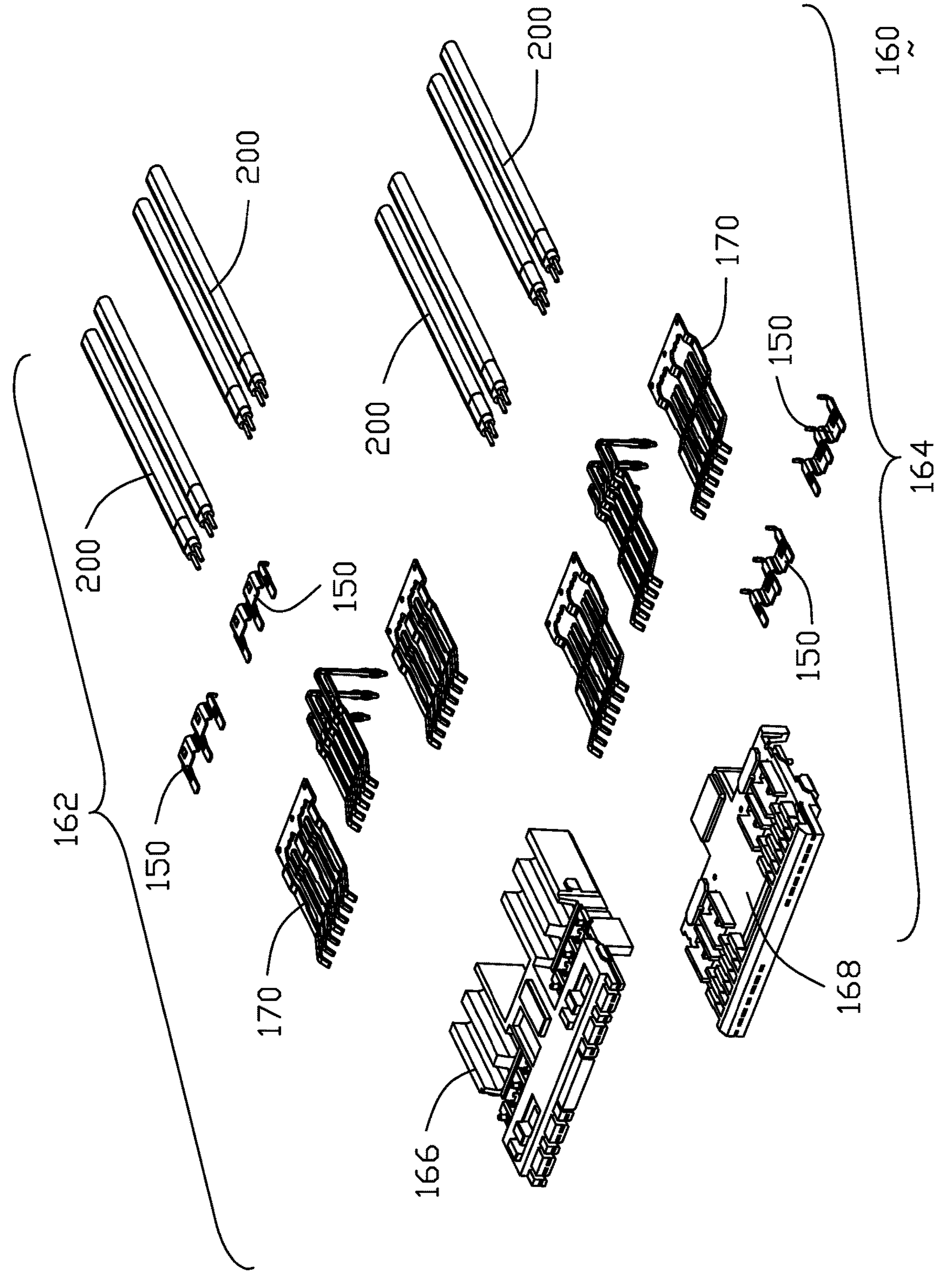
FIG. 12(A) is an exploded perspective view of the lower part of the contact module of the electrical connector assembly of FIG. 8(A)
Figure 12B:
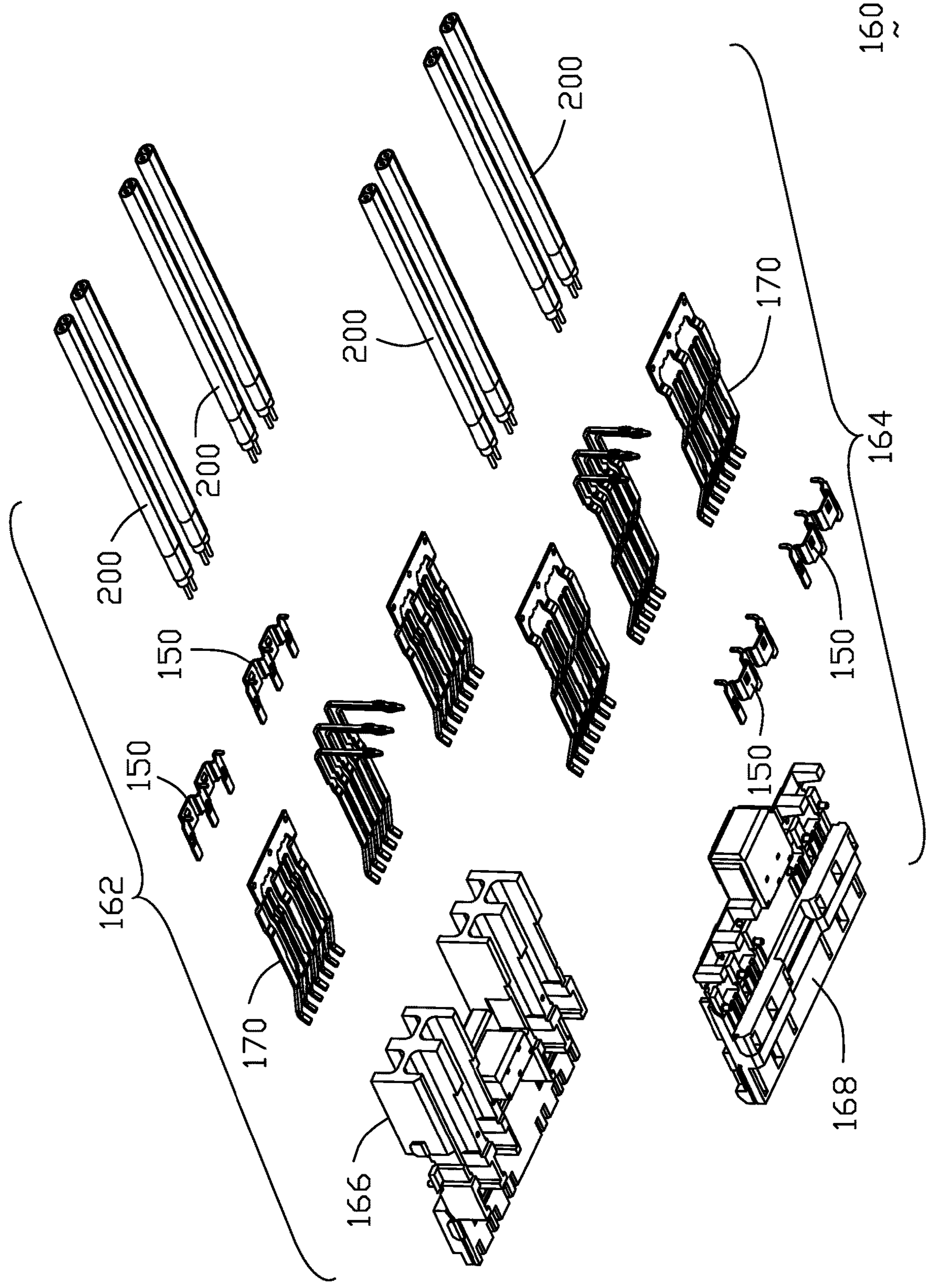
FIG. 12(B) is another exploded perspective view of the lower part of the contact module of the electrical connector assembly of FIG. 12(A)

As shown in FIG. 11(A), the contacts 140 include a plurality of side-band contacts 141 retained in the middle sector to form a side-band contact zone (not labeled), and a plurality of differential-pair contacts 142 retained in the side sector (not labeled) to form a pair of differential-pair contact zones (not labeled) by two sides the side-band contact zone (not labeled). The side sector (not labeled) forms a plurality of grooves (not labeled) to receive the tail sections 142T of the differential-pair contacts and the inner conductors 202 of the corresponding wires 200 which are associatively soldered thereon, and a plurality of slots (not labeled) aligned with the corresponding grooves (not labeled) to receive the wires 200. Each wire 200 includes a pair of inner conductors 202, a pair of inner insulative layers 203, a metallic braiding layer 204 and an outer insulative jacket 205 sequentially and concentrically arranged with one another wherein the inner conductors 202 are soldered to the tail sections 142T of the corresponding differential-pair contacts 142. The contacts 140 further include a plurality of grounding contacts 144 alternately arranged with the corresponding differential-pair contacts 142. The grounding contacts 144 are unified together via a rear transverse bar 146. Three holes 147 are formed in the transverse bar 146 in alignment with the corresponding grounding contacts 144, respectively, in the front-to-back direction. In this embodiment, the contacts 140 include one set of side-band contacts 141 and two sets of differential-pair contacts 142 by two sides of the side-band contacts 141 in the transverse direction, wherein the set of side-band contacts 141 include five pieces, and each set of differential-pair contacts 142 include two pairs of the differential-pair contacts 142 alternately arranged with three grounding contacts 144. Understandably, the tail sections of the side-band contacts 141 are directly soldered to the printed circuit board 900 on which the connector 100 is mounted.

Each differential-pair contact zone (not labeled) is further equipped with a metallic grounding bracket 150 to cooperate with the corresponding transverse bar 146 to sandwich the braiding layers 204 of the corresponding wires 200 therebetween in the vertical direction, wherein the grounding bracket 150 and the transverse bar 146 are optimally soldered with the braiding layer 204.

Figure 9:
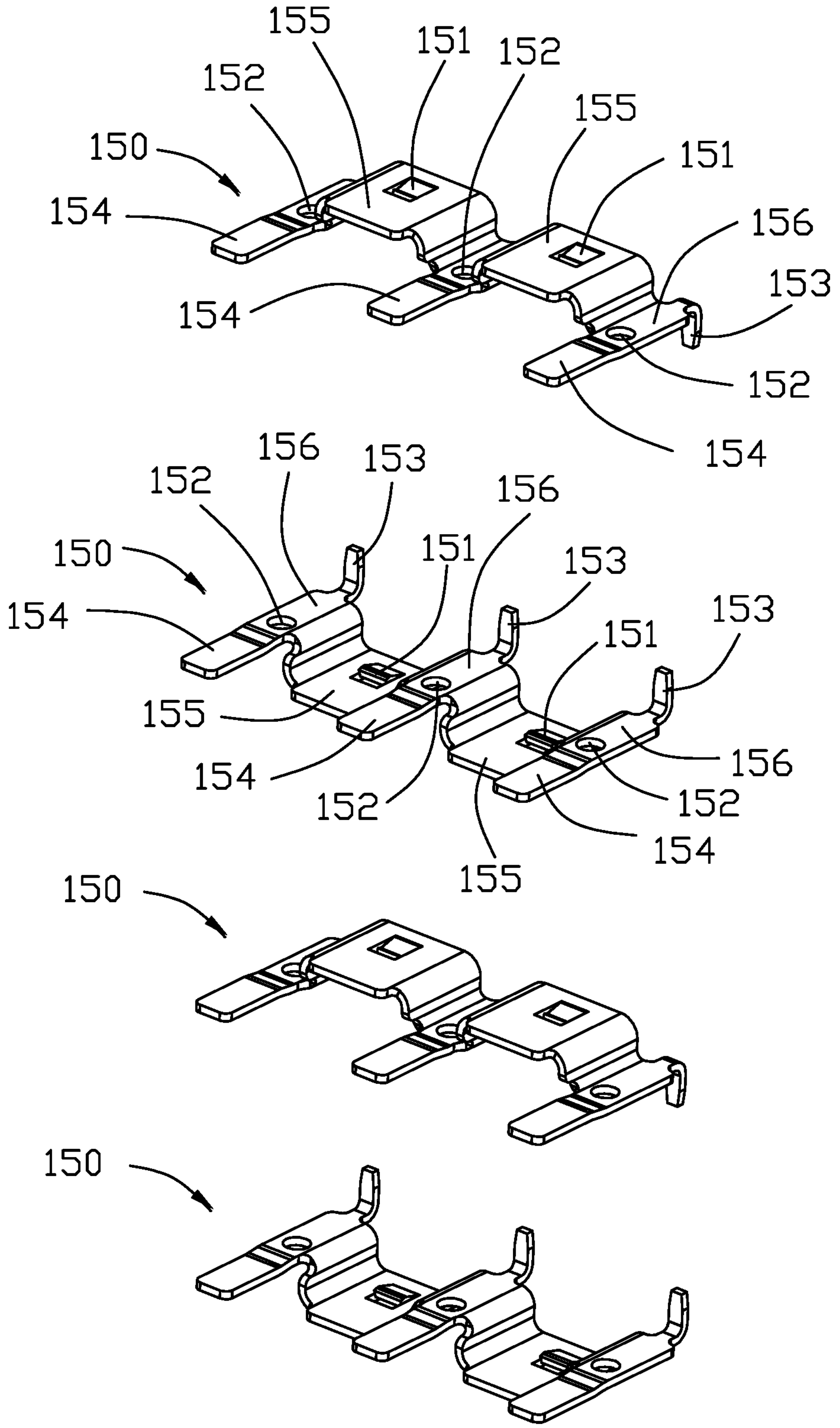
FIG. 9 is a perspective view of grounding brackets used within the contact module of the electrical connector assembly of FIG. 6(A)
Figure 10A:
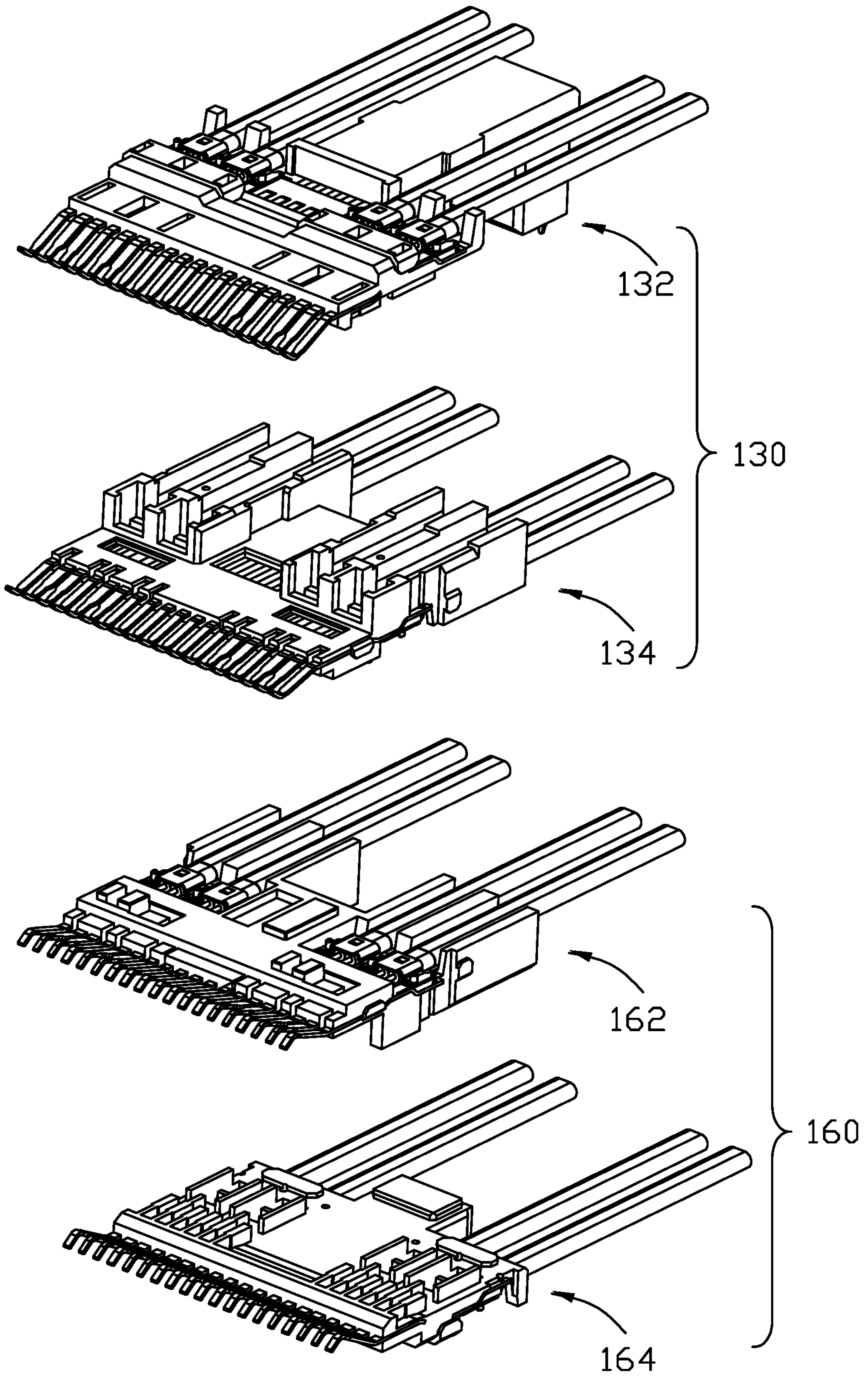
FIG. 10(A) is an exploded perspective view of the contact module of the electrical connector assembly of FIG. 6(A) without showing the metallic shells.
Figure 10B:
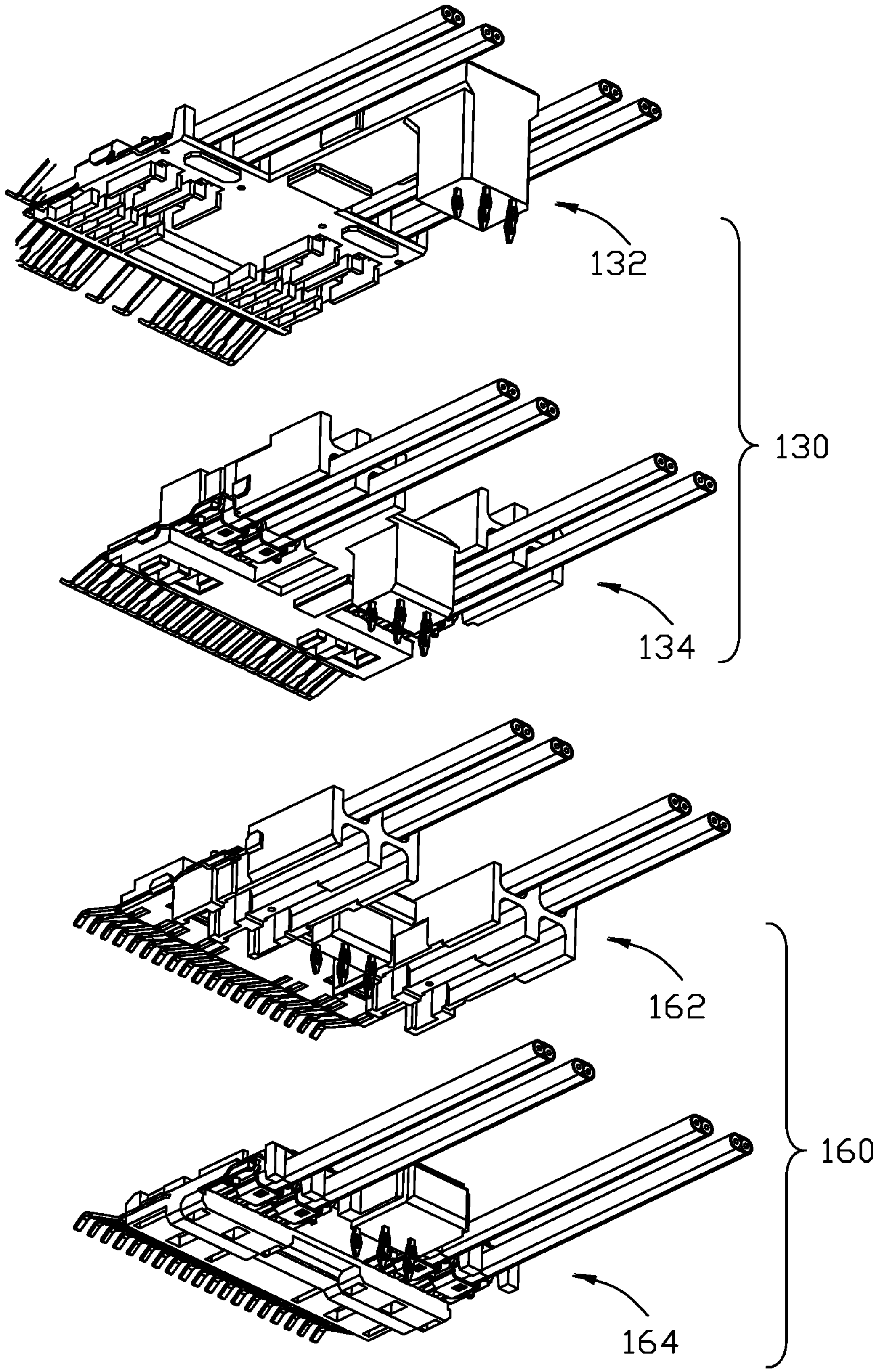
FIG. 10(B) is another exploded perspective view of the contact module of the electrical connector assembly of FIG. 10(A)
Figure 10C:
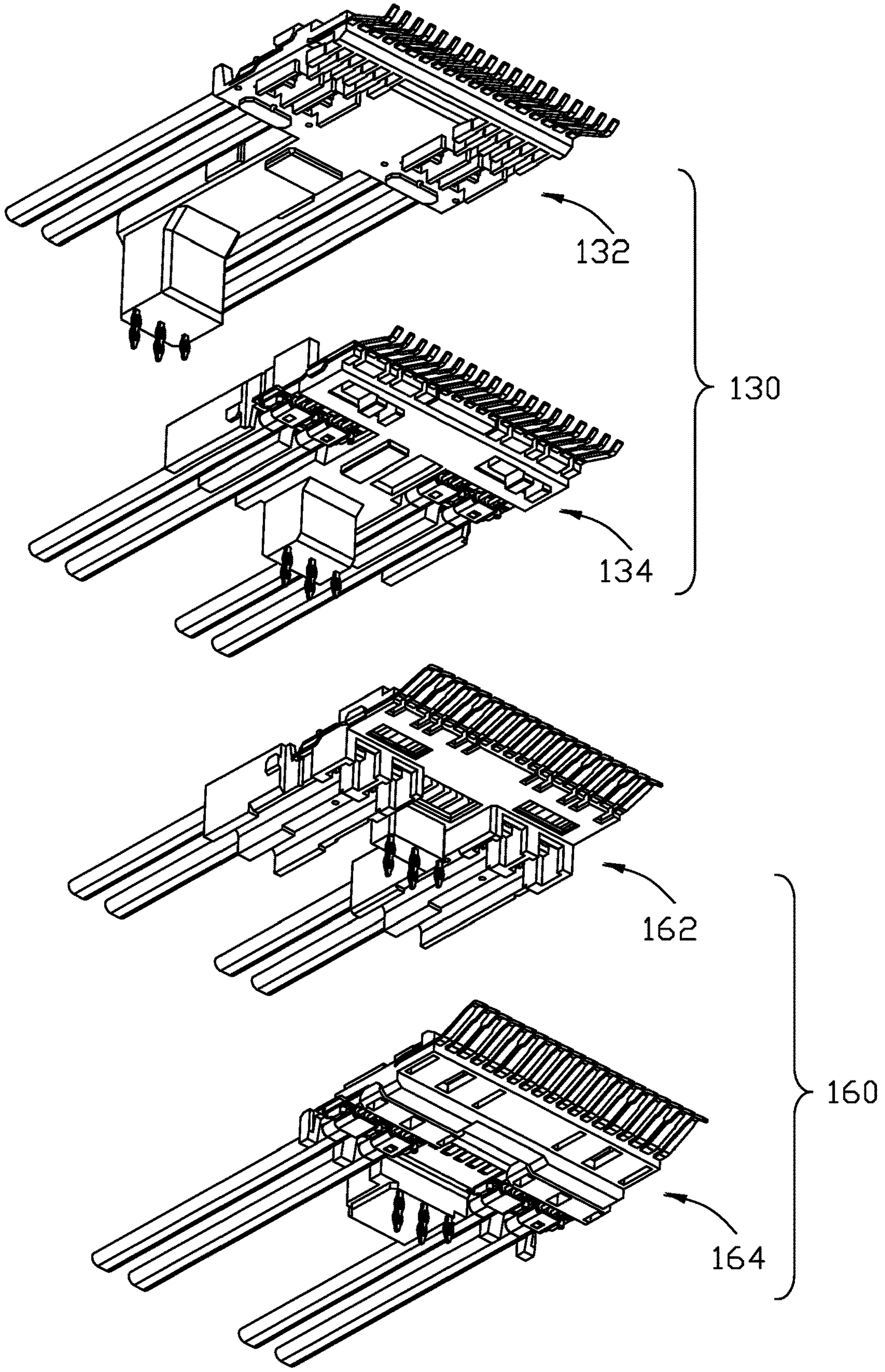
FIG. 10(C) is another exploded perspective view of the contact module of the electrical connector assembly of FIG. 10(A)

Notably, as shown in FIG. 9, the grounding bracket 150 includes three strap sections 156 and two bulged section 155 alternately arranged with each other in the transverse direction with three extensions 154 forwardly and slightly obliquely extending from the corresponding strap section 156 to mechanically and electrically connect the tail sections 144T of the corresponding grounding contacts 144, respectively. Three solder termination pins 153 extend, in a vertical direction, from a rear end of the transverse bar 146 and in alignment with the corresponding grounding contacts 144, respectively, in a front-to-back direction, and further into the corresponding holes 147 in the transverse bar 146 in a soldering manner, respectively. Therefore, each grounding contact 144 and the corresponding grounding bracket 150 have two connection positions at the extension 154 and the solder termination pin 153. Each strap section 156 forms a hole 152 through which a heat-stake P on the insulator extends to be deformed to press the grounding bracket 150 in position. The bulged section 155 forms a tab 151 to compress the braiding layer 204 of the corresponding wire 200. Notably, the front deflectable contacting sections of the contacts 140 are exposed in front of the front edge of the insulative body 136.

The basic structure/arrangement of the rear/inner upper unit 134 is essentially similar to that of the front/outer upper unit 132 and includes the insulative body 138 and a plurality of contacts 140 integrally formed with the insulative body 138 via insert-molding. The rear/inner upper unit 134 also forms the middle side-band contact zone and a pair of differential-pair contact zones by two sides. The lower side of the differential-pair contact zone forms a plurality of grooves to receive the tail sections of the differential-pair contacts 142 of the contacts 140 and the inner conductors 202 of the corresponding wires 200, and a plurality of slots aligned with the corresponding grooves to receive the corresponding wires 200. The upper side of the differential-contact zone forms a plurality of slots aligned with the corresponding slots of the front/outer upper unit 132 to receive the wires 200 of the front/outer upper unit 132. Notably, the grounding brackets 150 of the rear/inner upper unit 134 are in an upside-down manner with those of the front/outer upper unit 132.

The arrangement of the lower part 160 is similar to that of the upper part 130, and includes a front/outer lower unit 164 and a rear/inner lower unit 162 stacked with each other with the similar relationship defined in the upper part 130. In other words, each unit 164, 162 includes the insulative body 168, 166 and a plurality of contacts 170 integrally formed with the insulative body 168, 166 via insert-molding. Each unit 164, 162 also forms the side-band contact zone and the pair of differential-pair contact zones on two sides. Notably, the upper part 130 and the lower part 160 are essentially arranged in a mirror image manner in the vertical direction, including extension of the contacts and the stacking of the front/outer unit and the rear/inner unit, except the tail sections of the side-band contacts of both the upper part 130 and the lower part 160 extend downwardly instead of oppositely.

The shield 190 of the contact module assembly 120 includes a pair of metallic shields 192, 194 respectively assembled upon the upper part 130 and the lower part 160. Each of the shields 192, 194 includes the spring tangs 191 extending inwardly in the vertical direction to electrically and mechanically connect to the bulged sections 155 of the corresponding grounding brackets 150 for perfecting grounding. Each of the shields 192, 194 further includes extending finger 195 to contact the other for make common grounding. The housing 110 includes a front mating slot (not labeled) and a rea receiving space (not labeled). Two rows of passageways (not labeled) are formed by two sides of the mating slot (not labeled). The contact module assembly 120 is forwardly inserted into the receiving space (not labeled) of the housing 110 wherein the front deflectable contacting sections of the contacts 140, 170 are received within the corresponding passageways (not labeled), respectively, with the corresponding contacting points exposed in the mating slot (not labeled) which receives a mating tongue of the complementary connector. The shields 192, 194 includes engagement tabs 193 to be received within the corresponding engagement holes (not labeled) of the housing 110 so as to retain the contact module assembly 120 within the housing 110.

A pair of metallic mounting legs 290 are secured on two sides of the housing 110. Each of the mounting legs 290 includes a spring finger 292 to mechanically and electrically connect the corresponding extending finger 195 of the shields 192, 194 for common ground consideration, and a plurality of press-fit legs (not labeled) for mounting to the PCB 900. In this embodiment, an over-molding cover (not labeled) is applied upon a rear side of the contact module assembly 120 so as to complete the whole assembly of the connector 100 to shield the rear portion of the housing 110 while allowing the wires 200 to extend rearwardly.

Figure 13A:
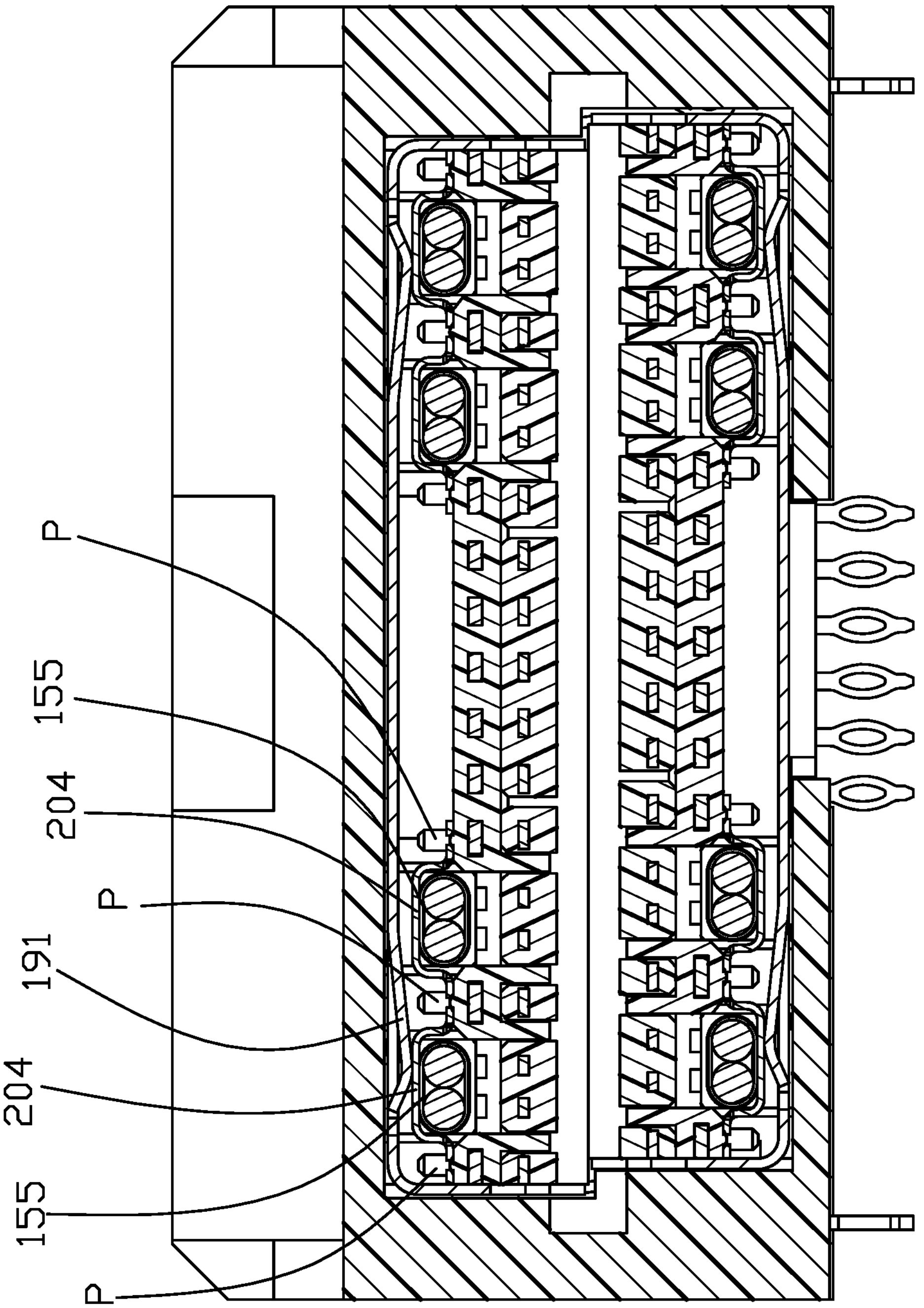
FIG. 13(A) is a cross-sectional view of the electrical connector assembly of FIG. 3(A)'.
Figure 13B:
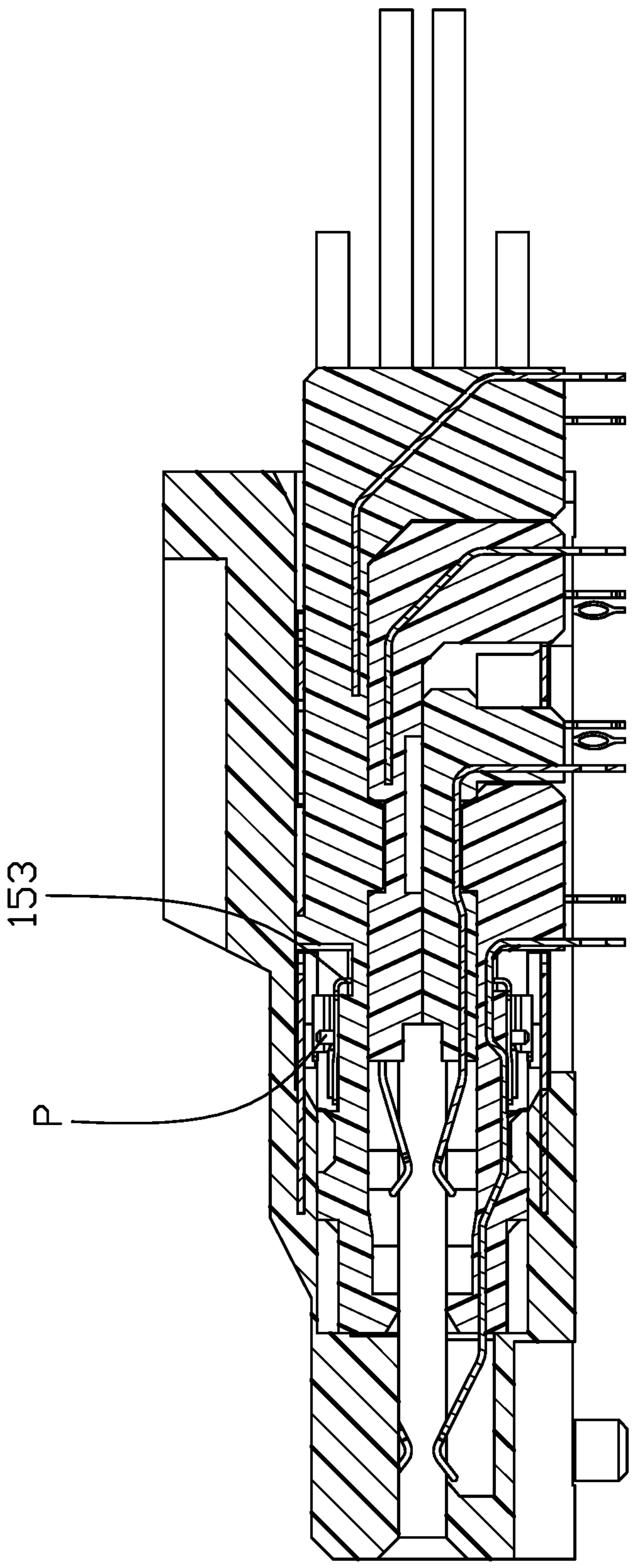
FIG. 13(B) is another cross-sectional view of the electrical connector assembly of FIG. 3(A)
Figure 13C:
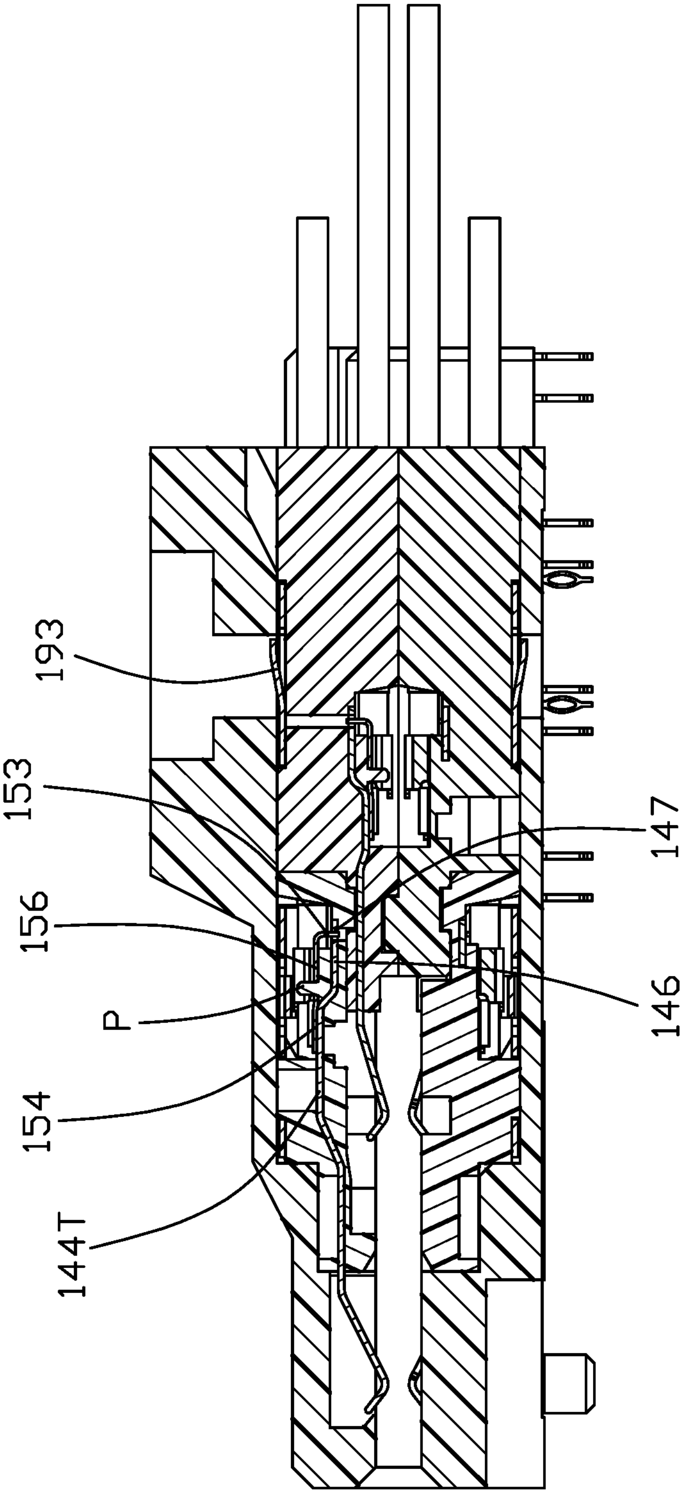
FIG. 13(C) is another cross-sectional view of the electrical connector assemble of FIG. 3(A)
Figure 13D:
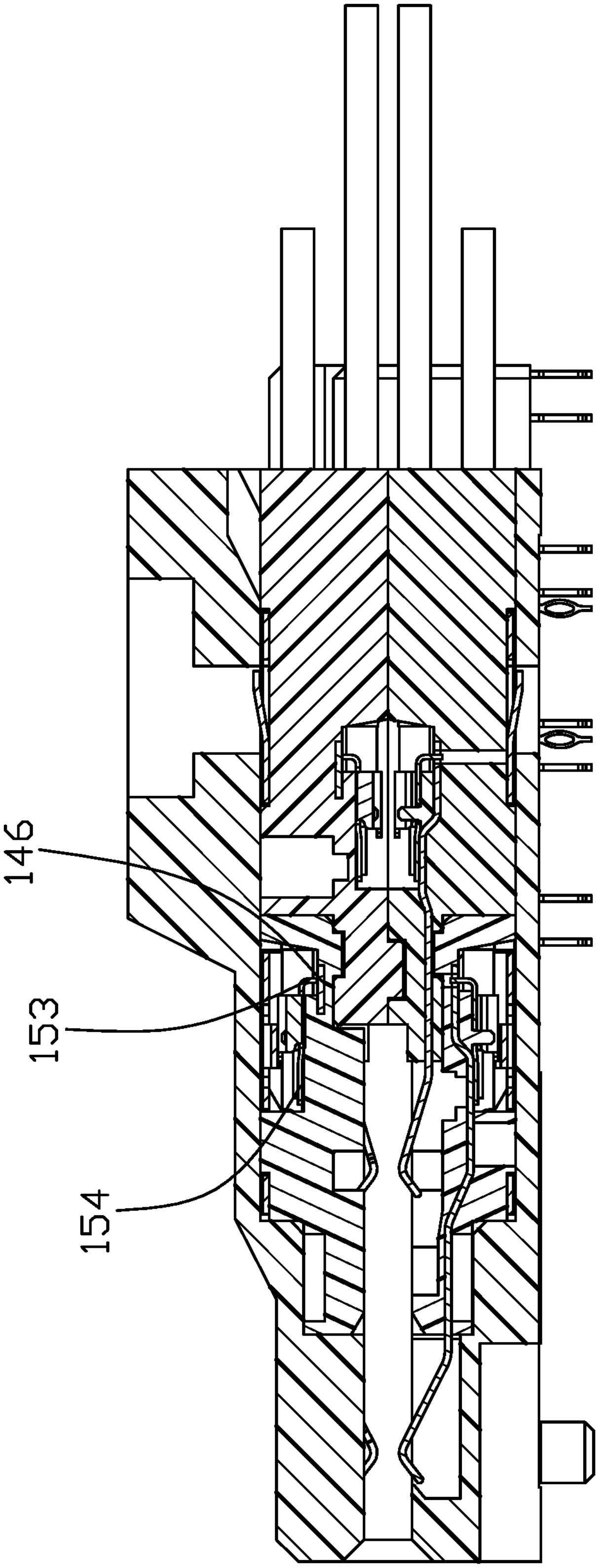
FIG. 13(D) is another cross-sectional view of the electrical connector assemble of FIG. 3(A)
Figure 13E:
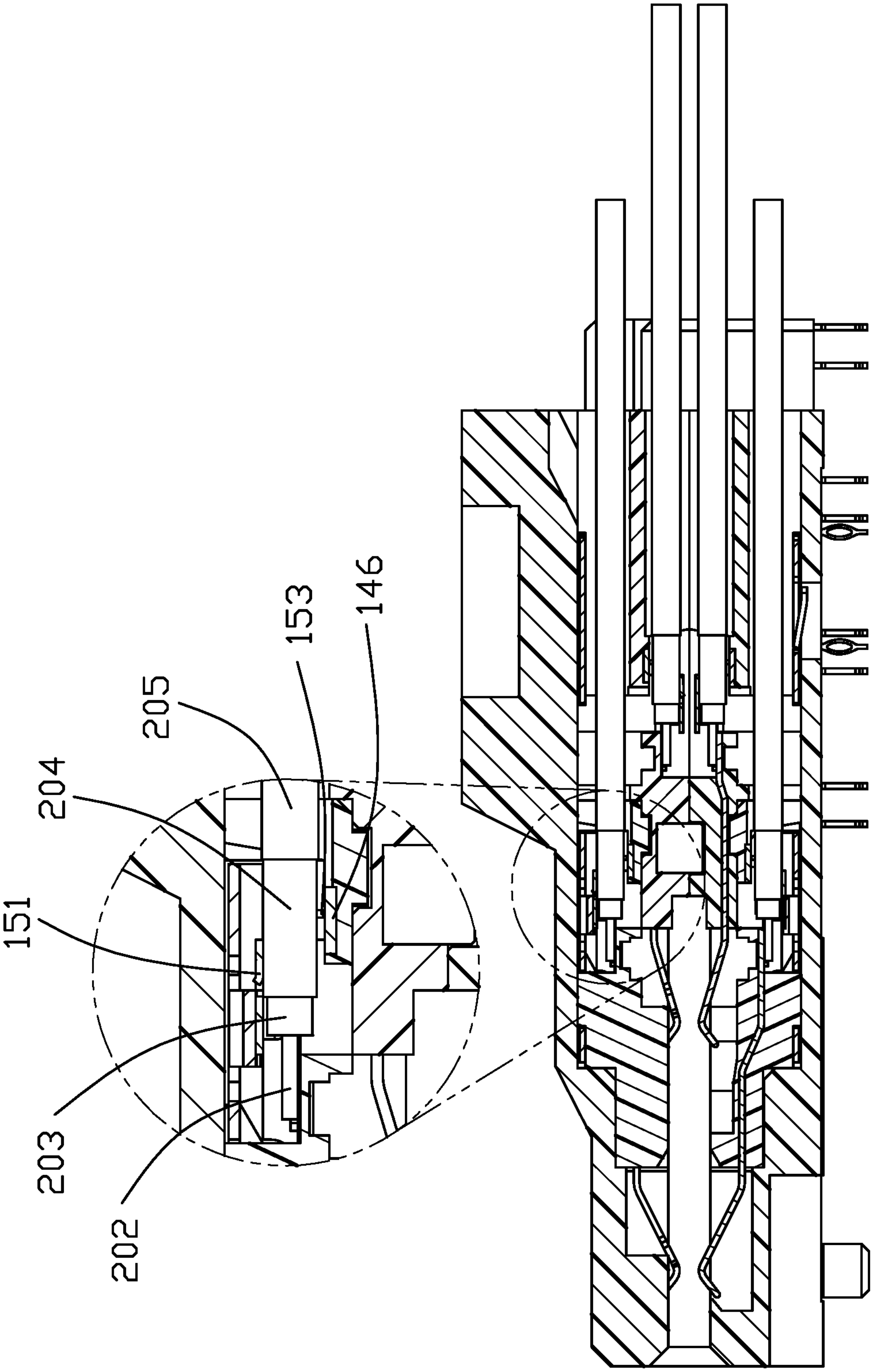
FIG. 13(E) is another cross-sectional view of the electrical connector assemble of FIG. 3(A)
Figure 14A:
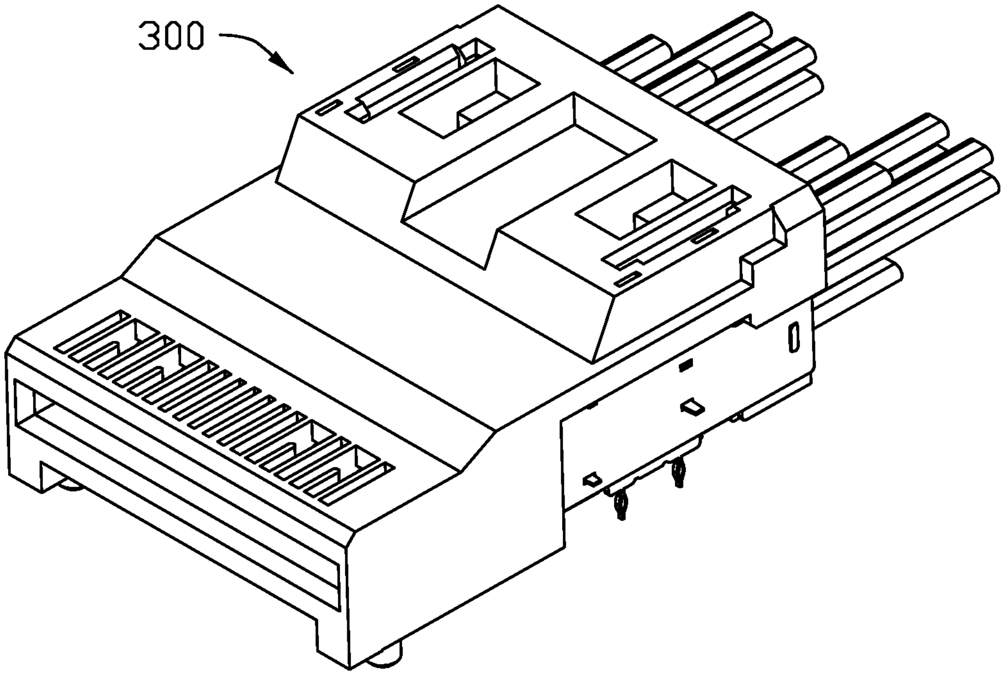
FIG. 14(A) is a perspective view of the electrical connector assembly according to the second embodiment of the invention.
Figure 14B:
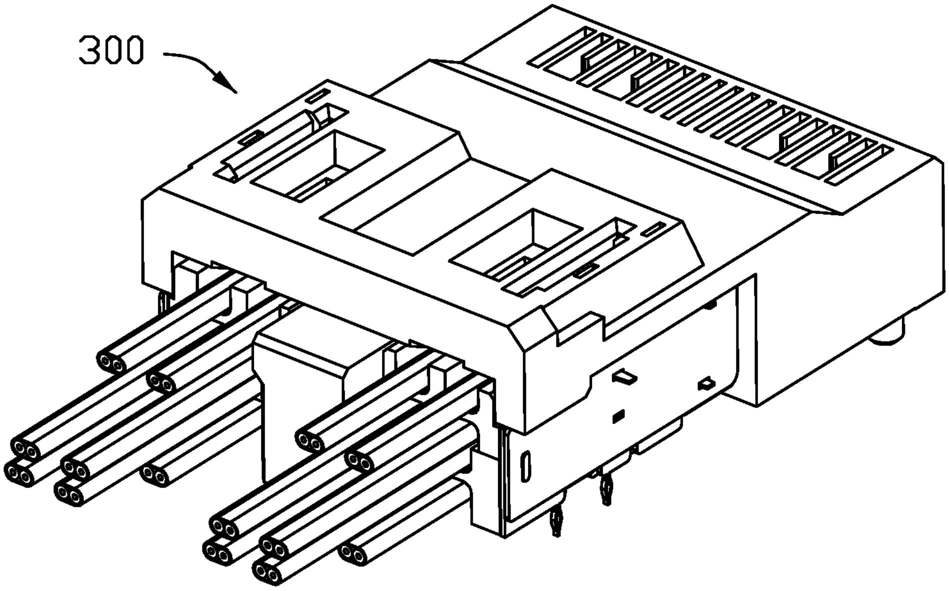
FIG. 14(B) is another perspective view of the electrical connector assembly of FIG. 14(A)
Figure 14C:
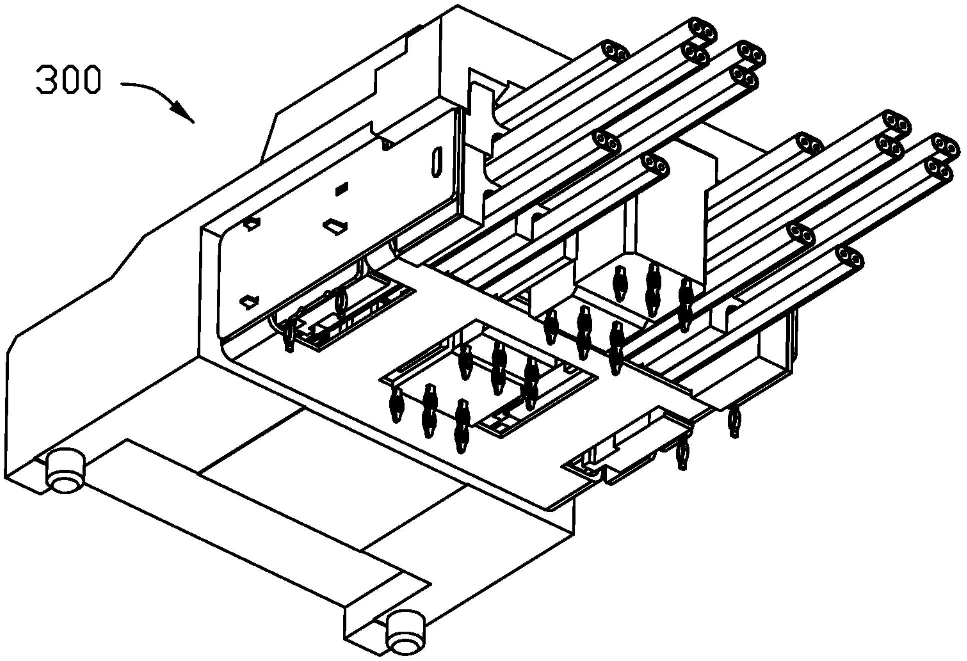
FIG. 14(C) is another perspective view of the electrical connector assembly of FIG. 14(A)
Figure 15A:
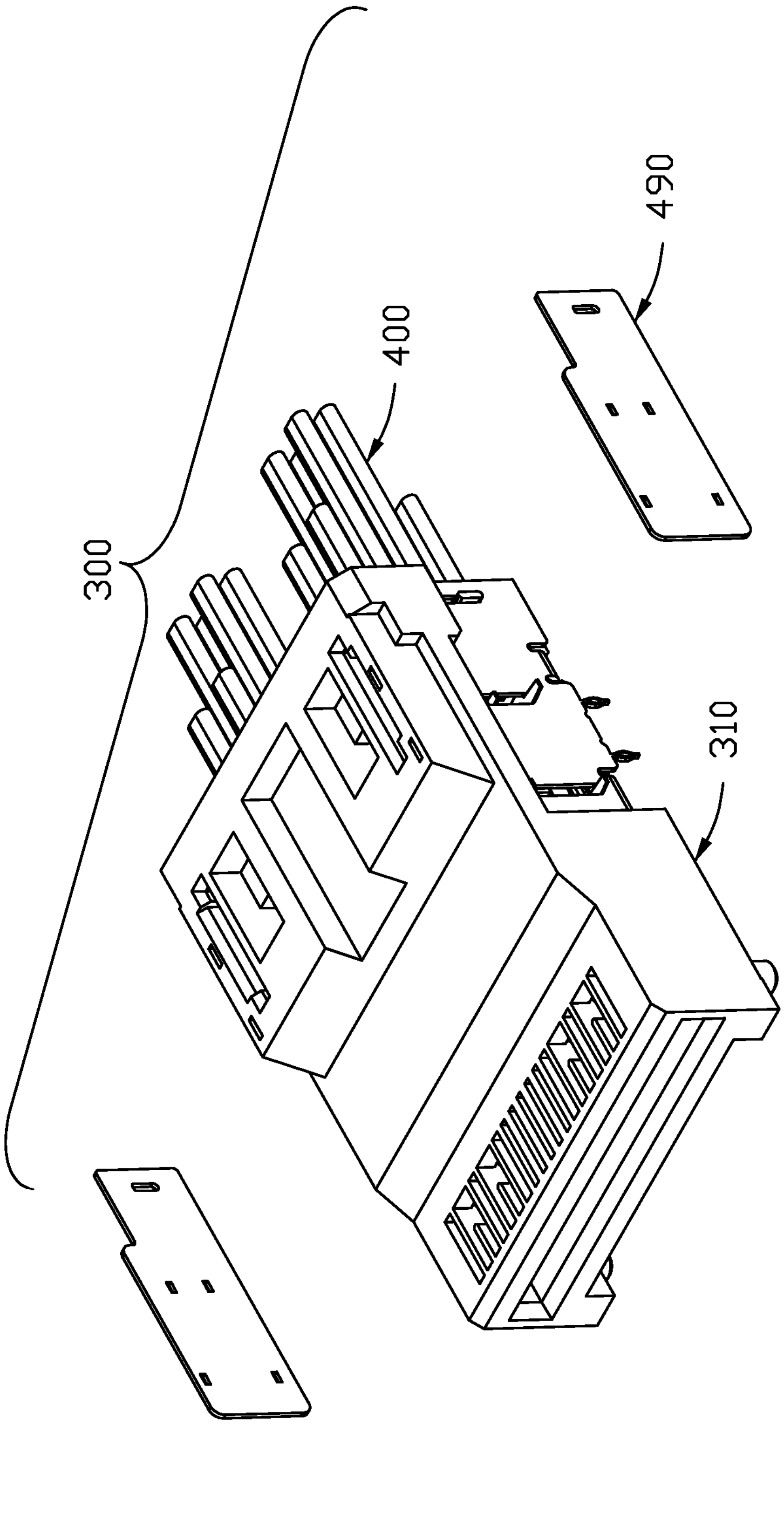
FIG. 15(A) is an exploded perspective view of the electrical connector assembly of FIG. 14(A)
Figure 15B:
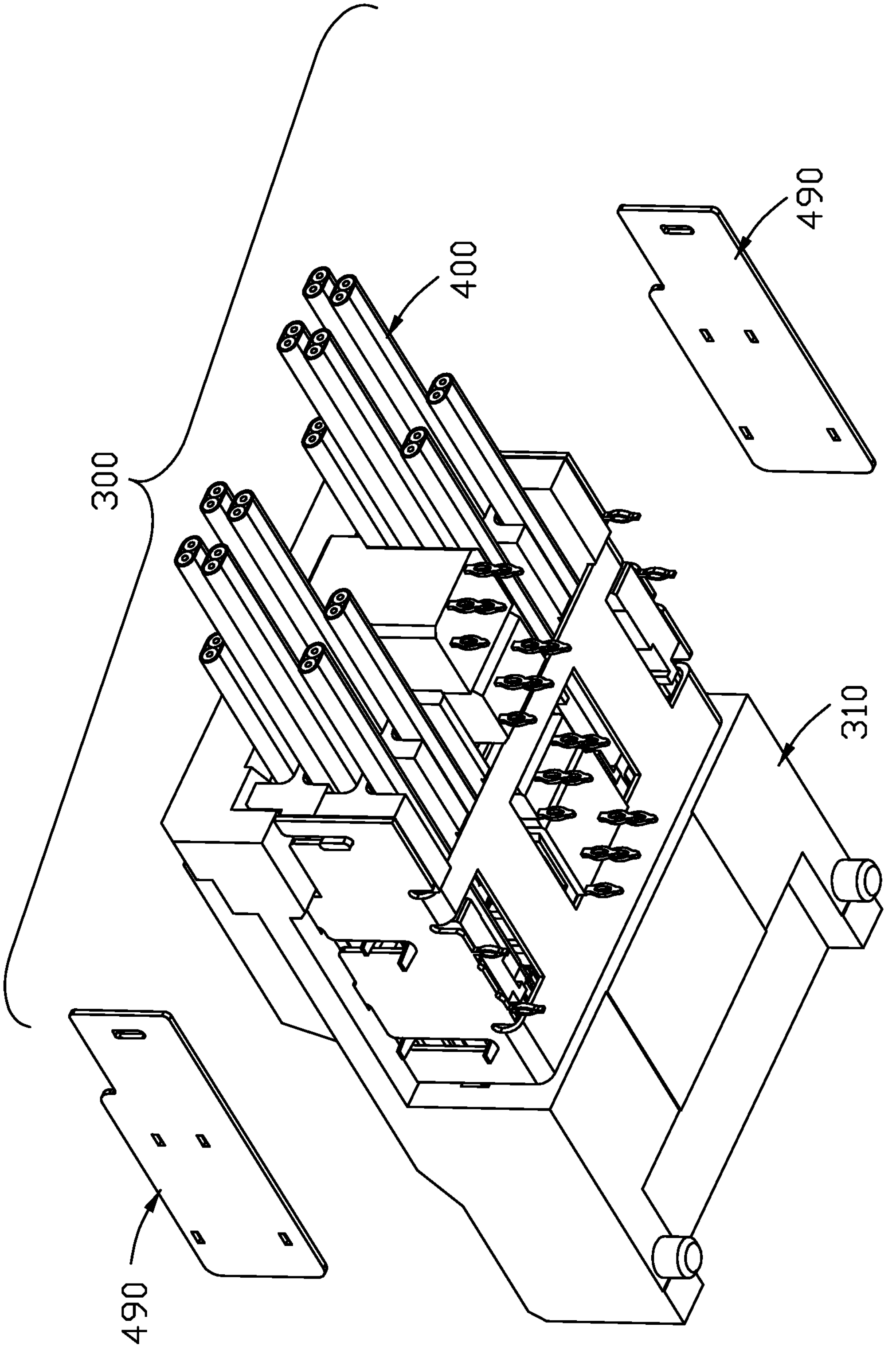
FIG. 15(B) is another exploded perspective view of the electrical connector assembly of FIG. 15(A)
Figure 16A:
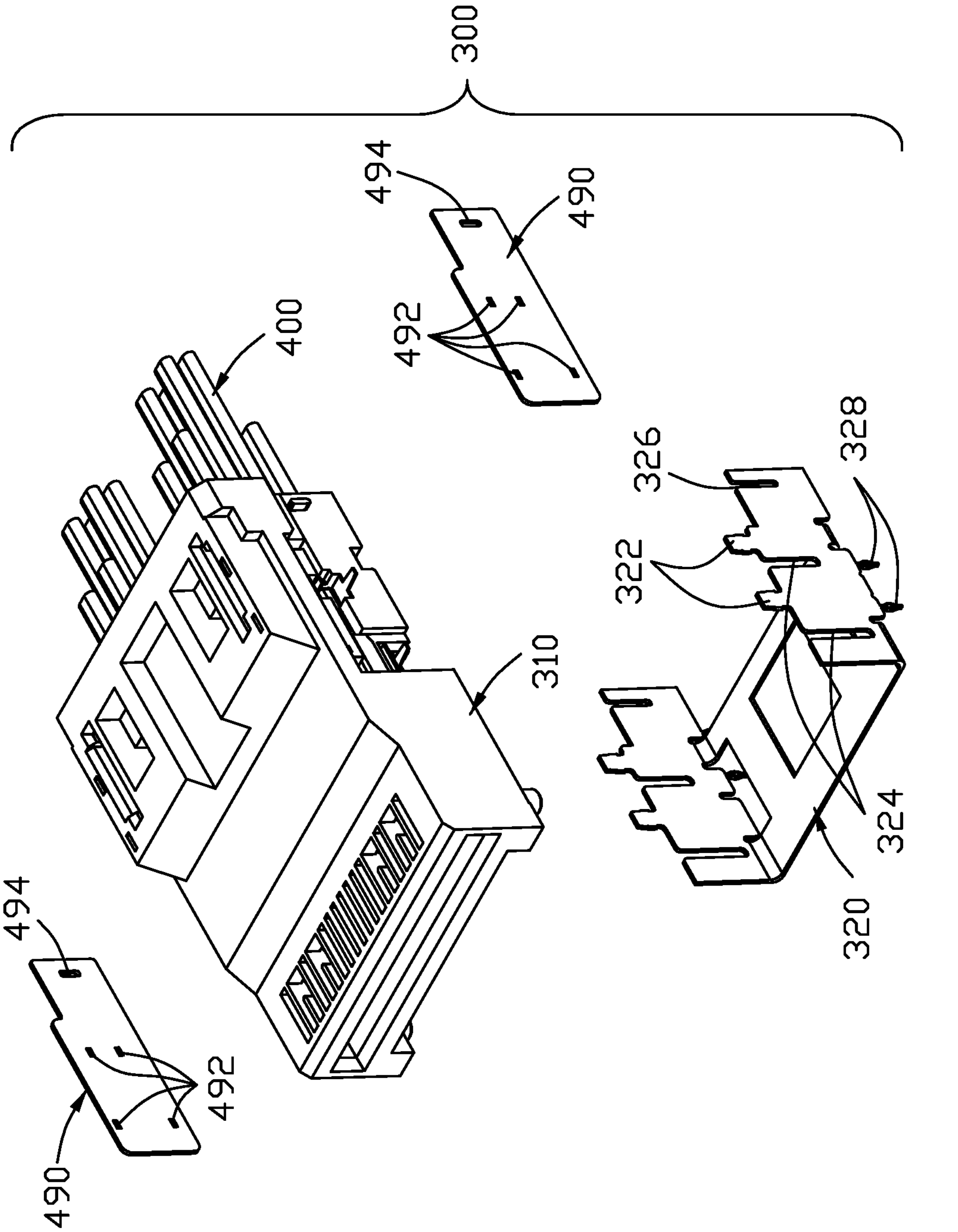
FIG. 16(A) is a further exploded perspective view of the electrical connector assembly of FIG. 15(A)
Figure 16B:
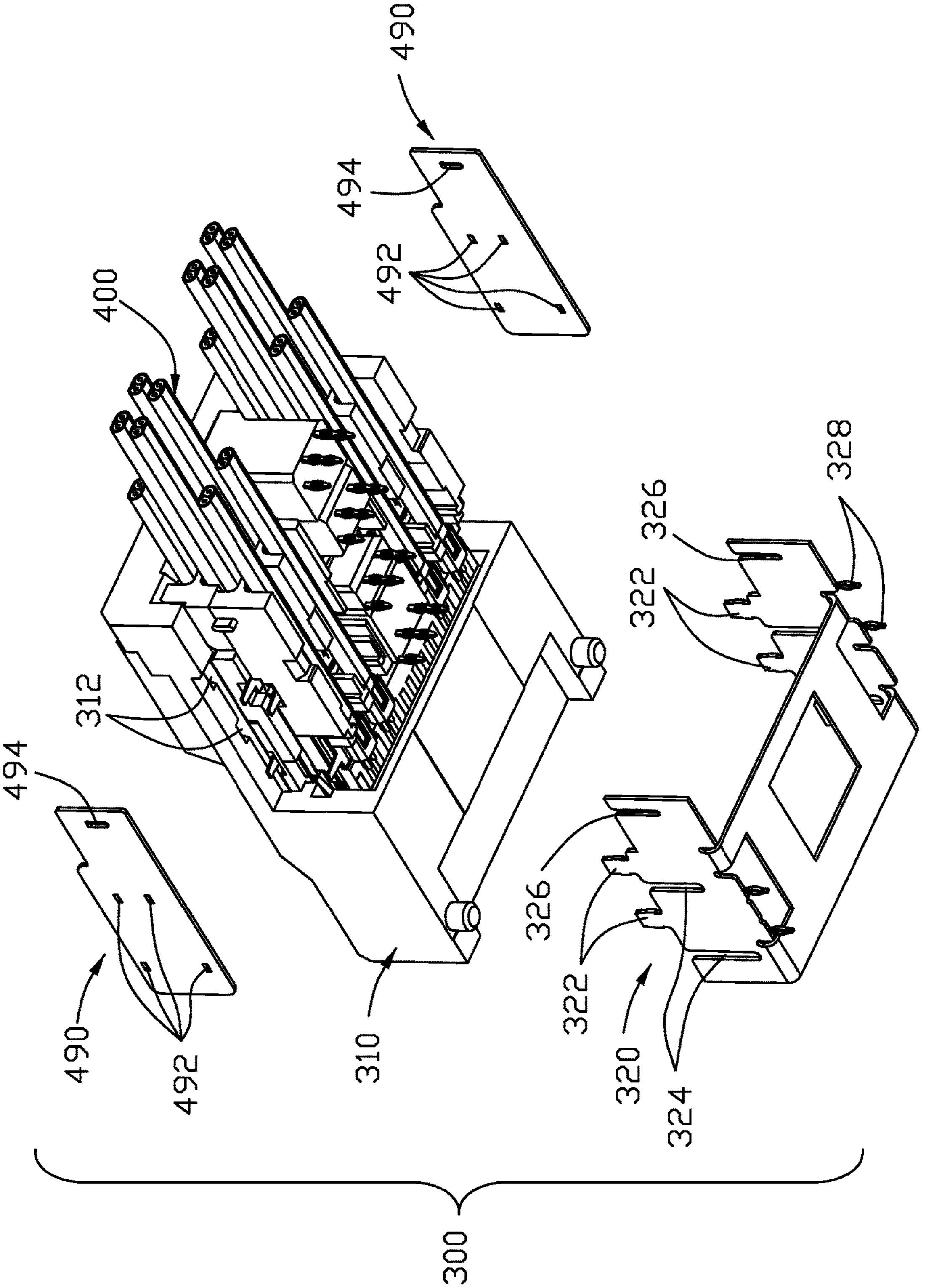
FIG. 16(B) is another exploded perspective view of the electrical connector assembly of FIG. 16(A)
Figure 17A:
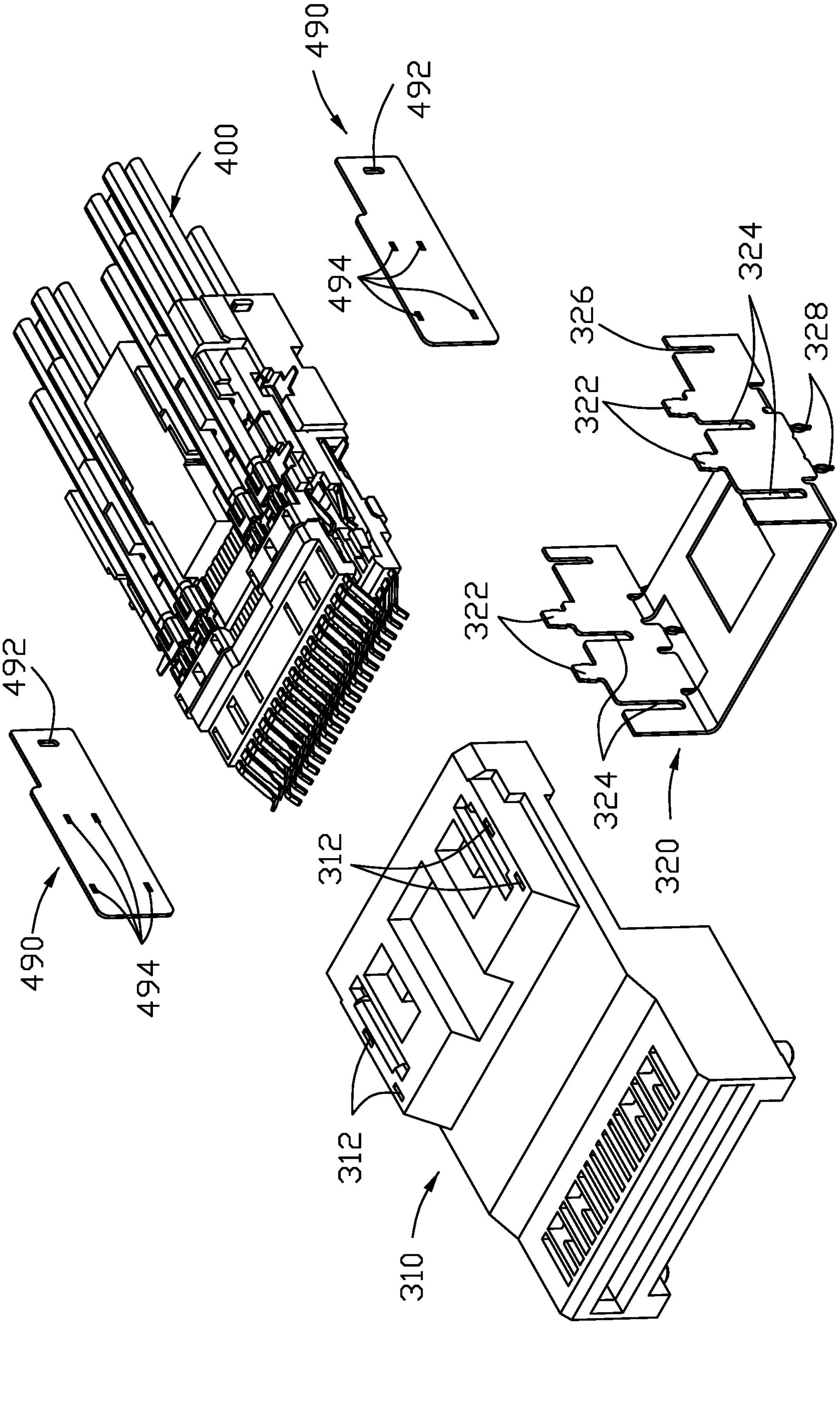
FIG. 17(A) is a further exploded perspective view of the electrical connector assembly of FIG. 16(A)
Figure 17B:
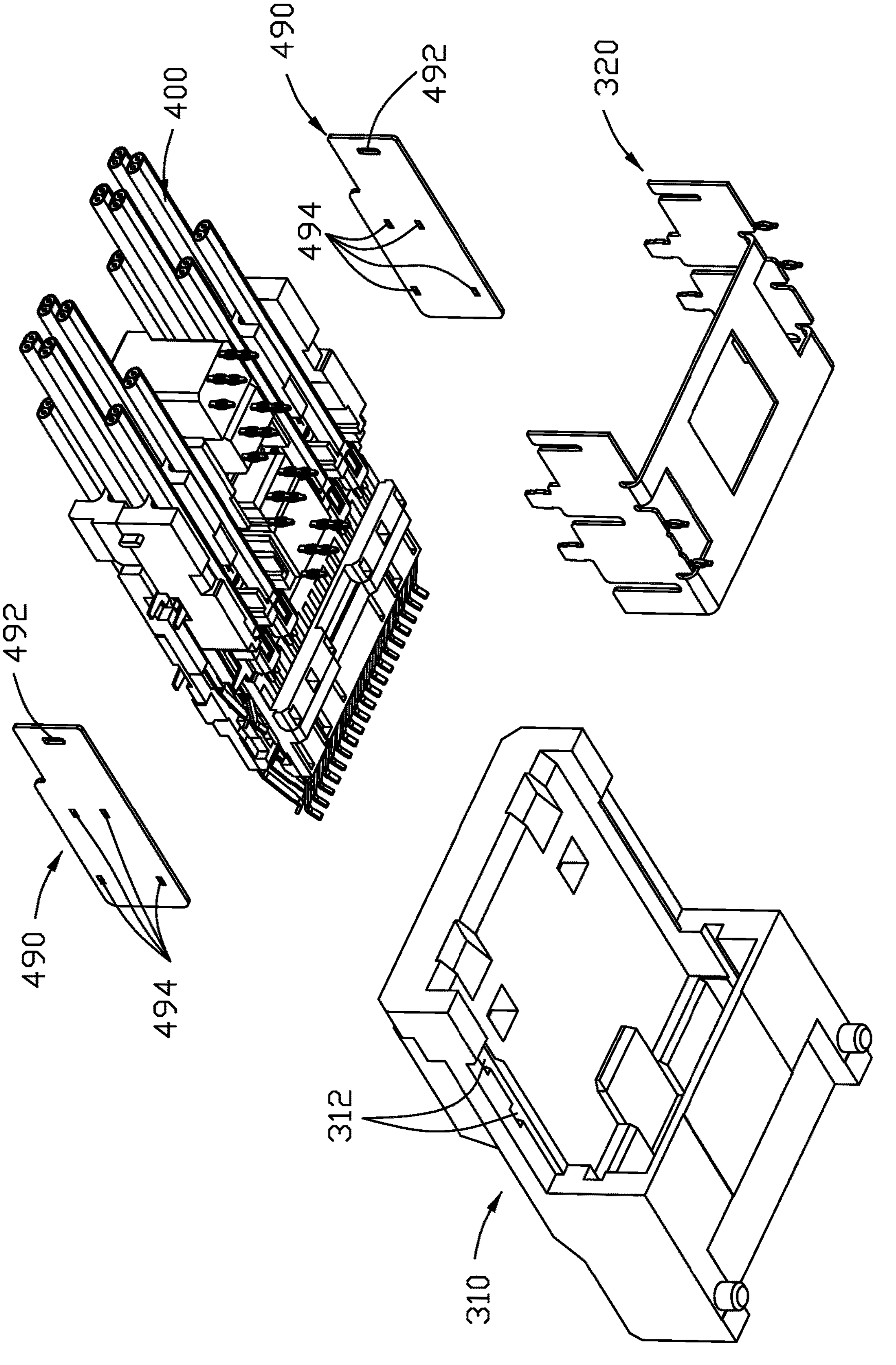
FIG. 17(B) is another exploded perspective view of the electrical connector assembly of FIG. 17(A)
Figure 18:
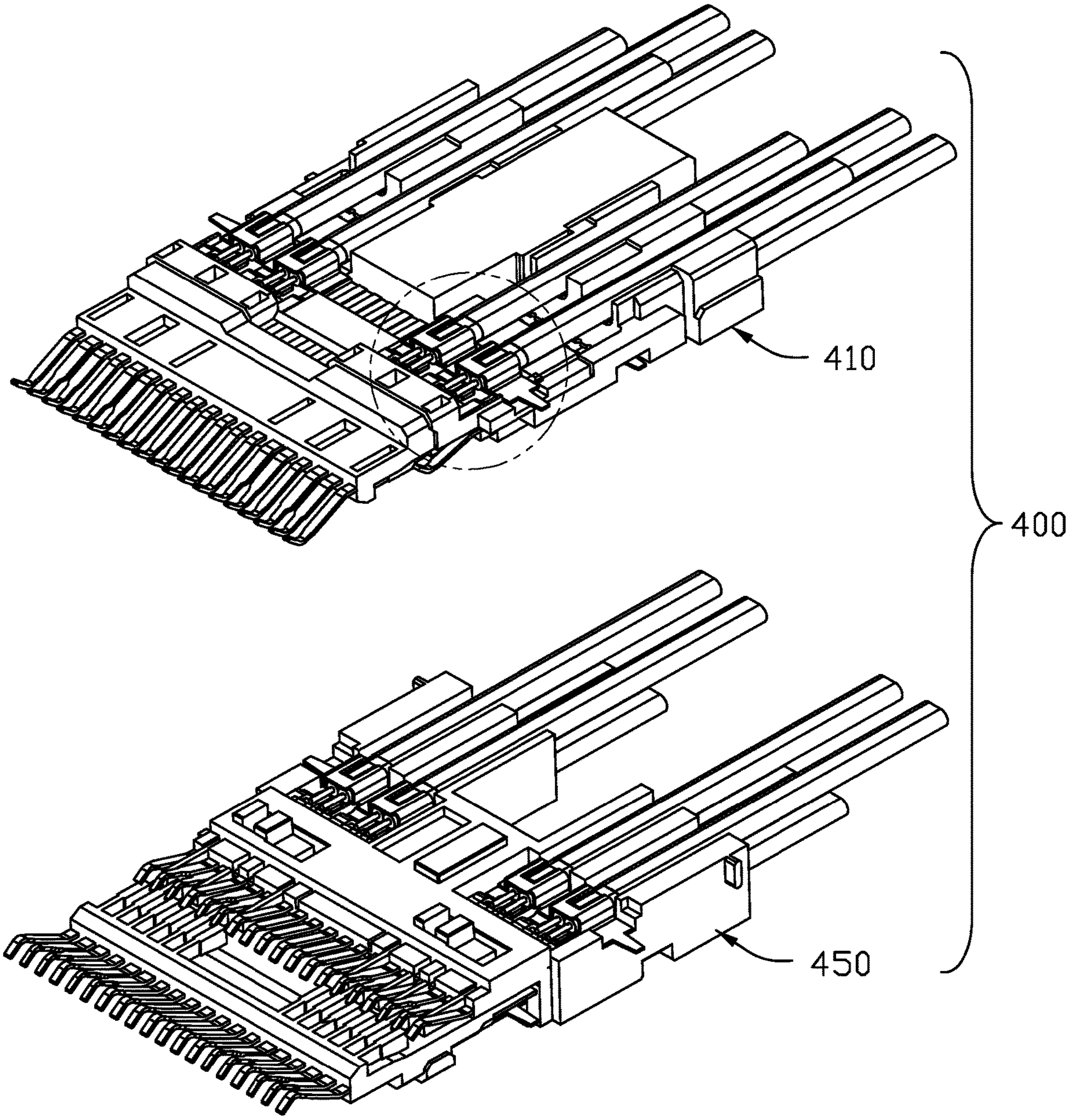
FIG. 18 is an exploded perspective view of the contact module of the electrical connector assembly of FIG. 17(A)
Figures 1, 18:
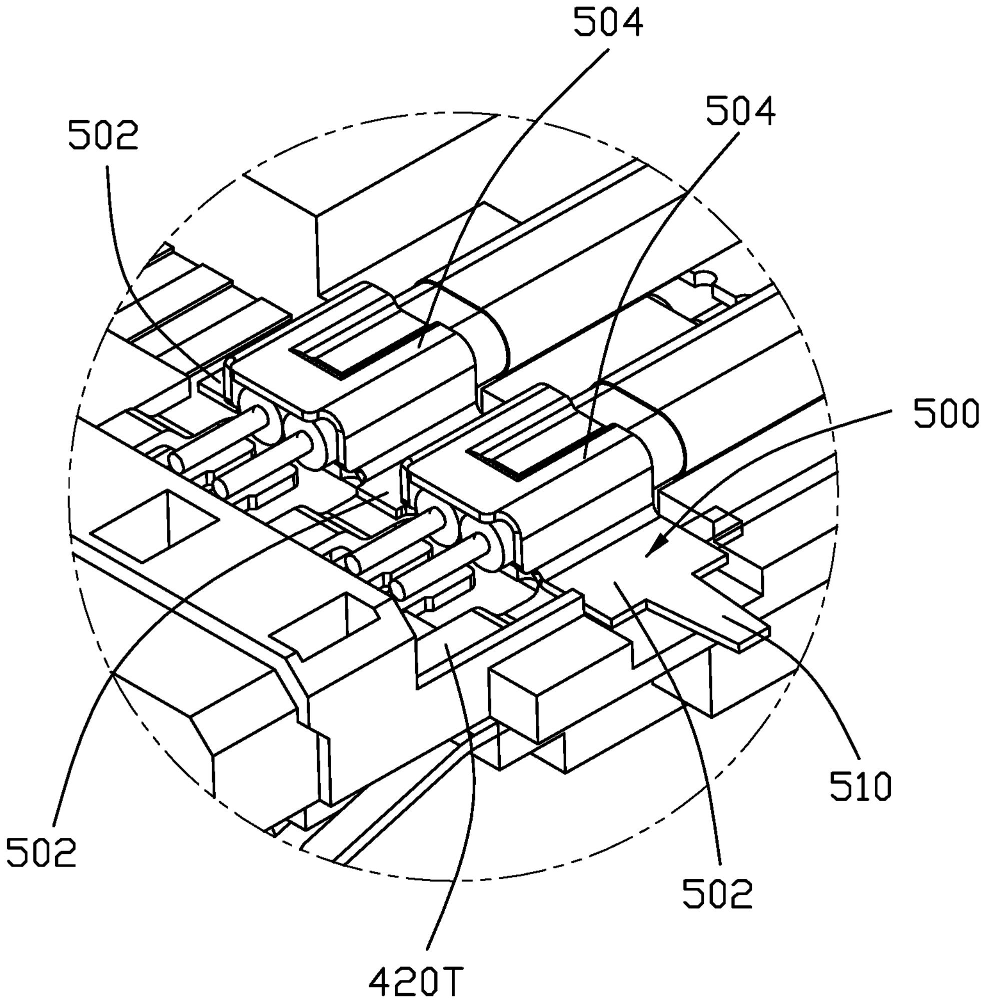
Figure 19:
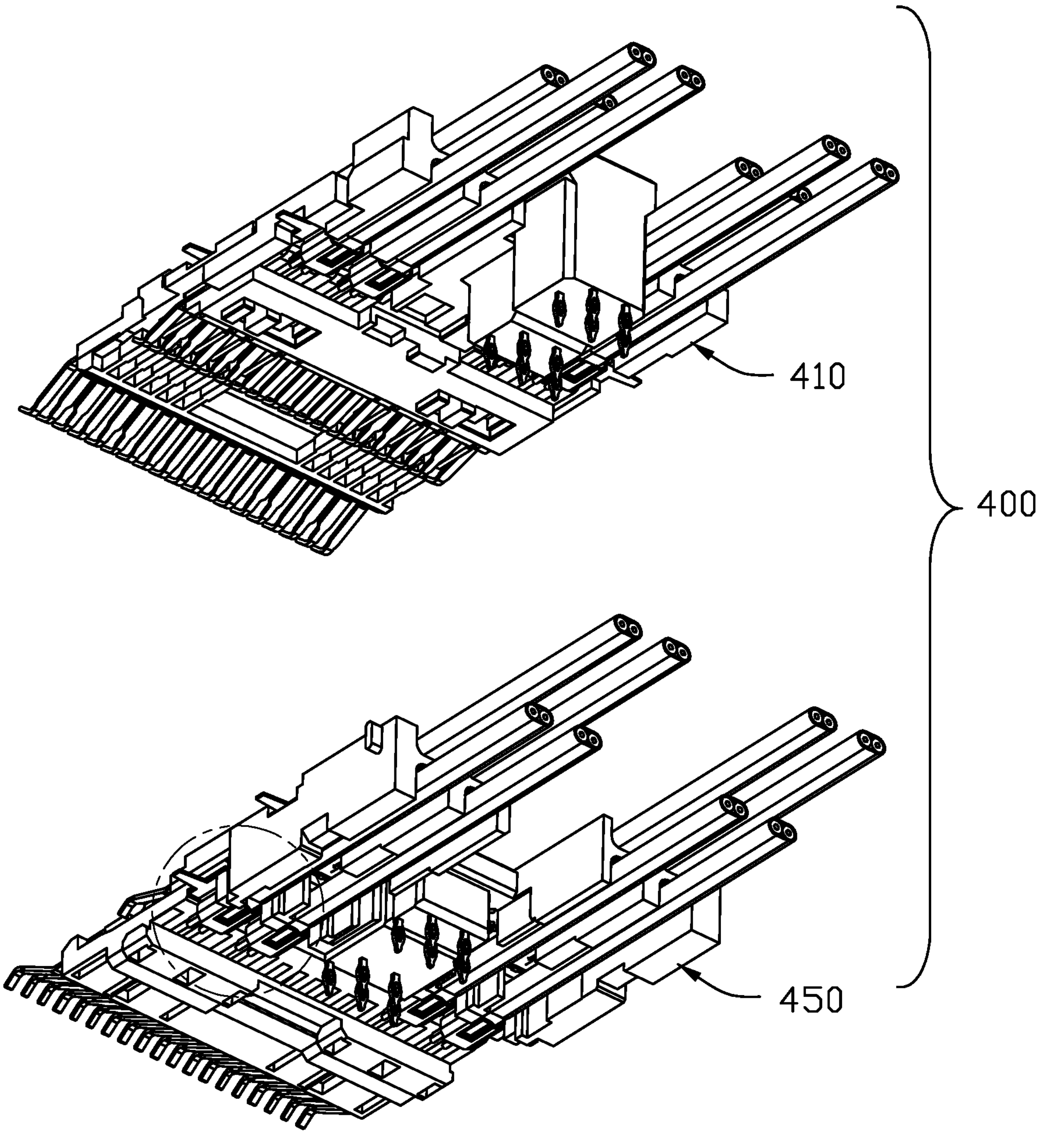
FIG. 19 is another exploded perspective view of the contact module of the electrical connector assembly of FIG. 18.
Figures 1, 19:
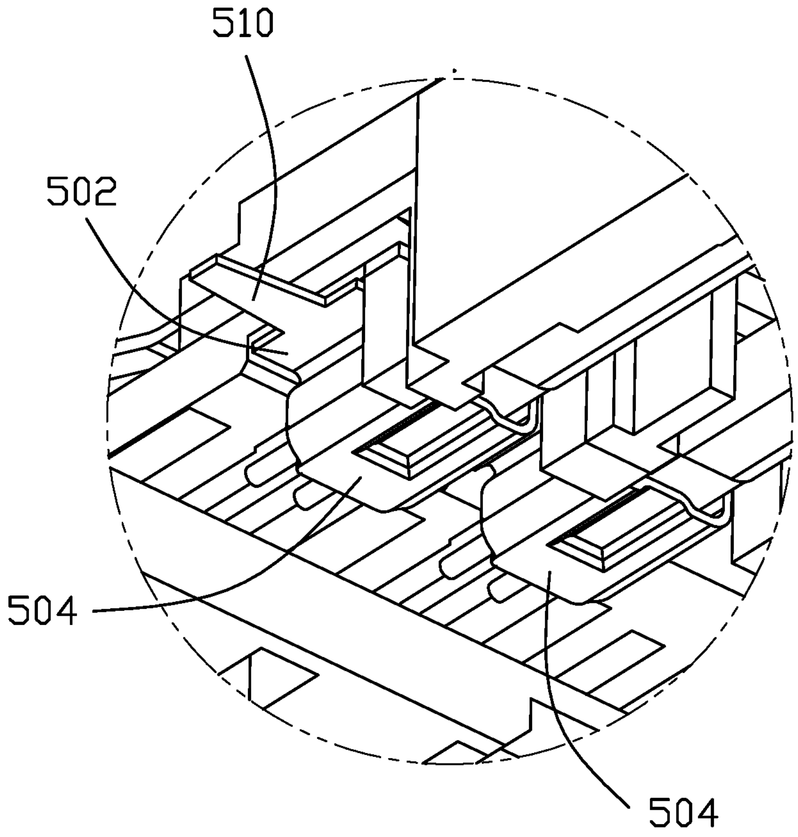
Figure 20A:
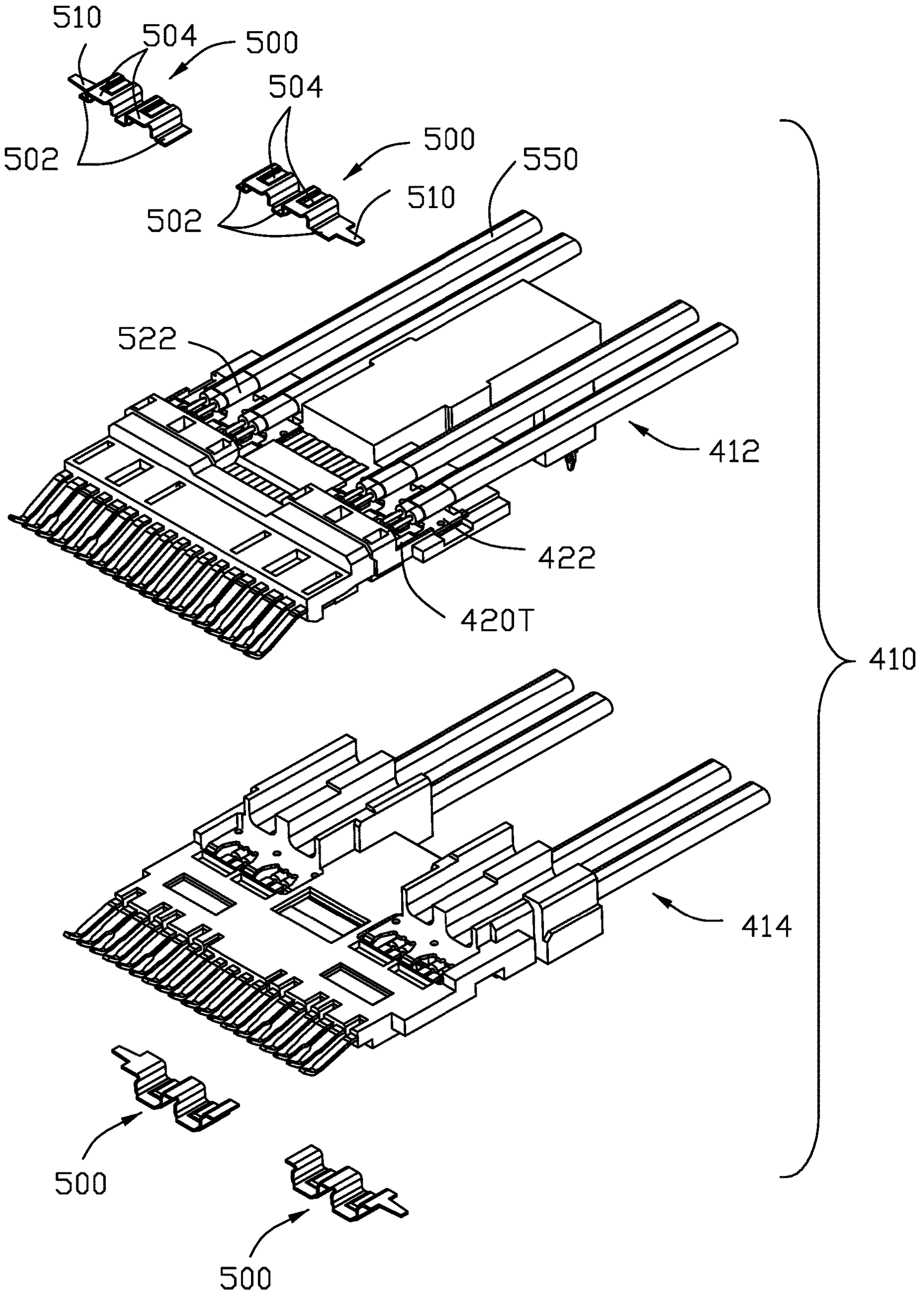
FIG. 20(A) is a further exploded perspective view of the upper part of the contact module of the electrical connector assembly of FIG. 18.
Figure 20B:
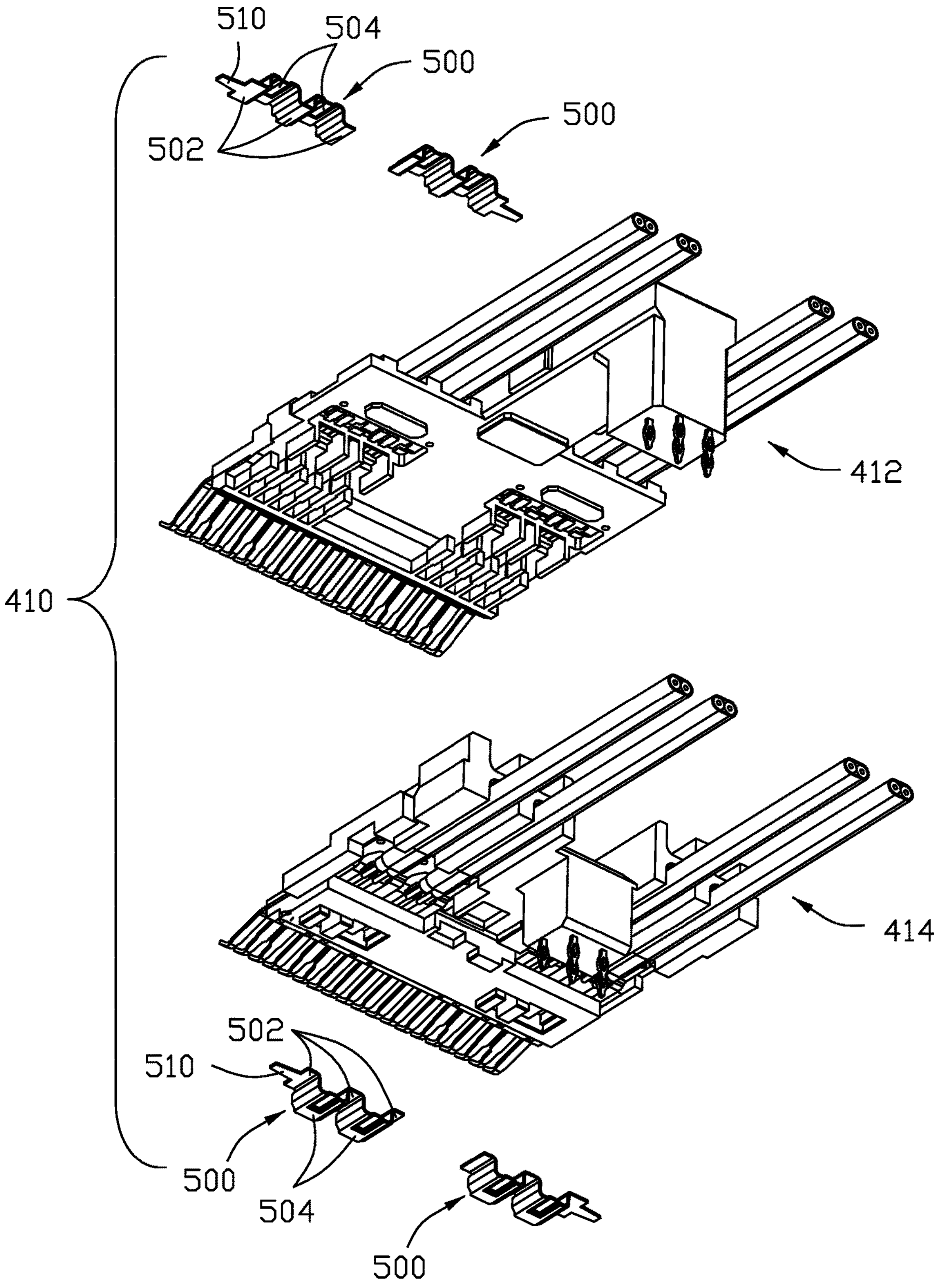
FIG. 20(B) is another exploded perspective view of the upper part of the contact module of the electrical connector assembly of FIG. 20(A)
Figure 21A:
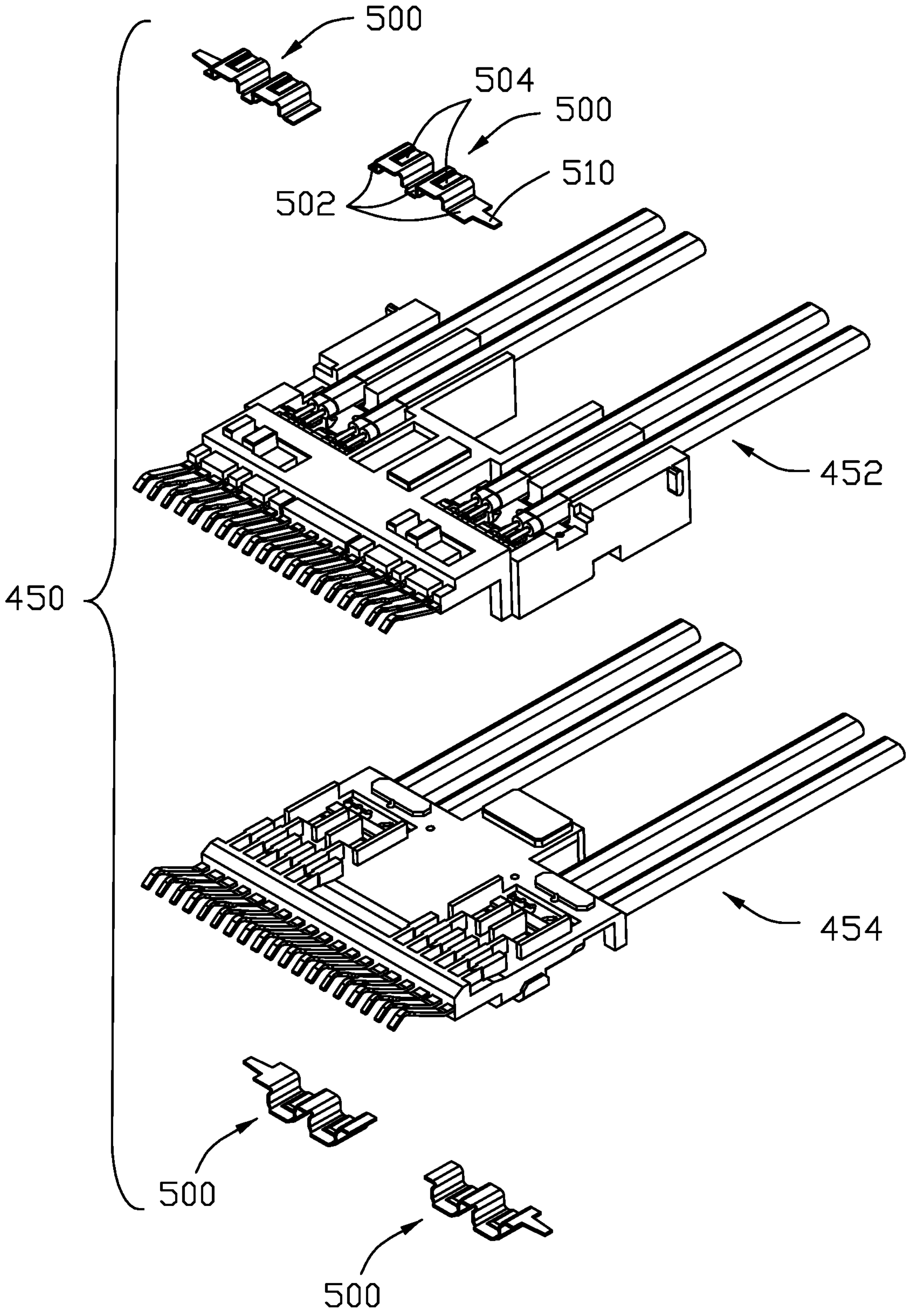
FIG. 21(A) is a further exploded perspective view of the lower part of the contact module of the electrical connector assembly of FIG. 18.
Figure 21B:
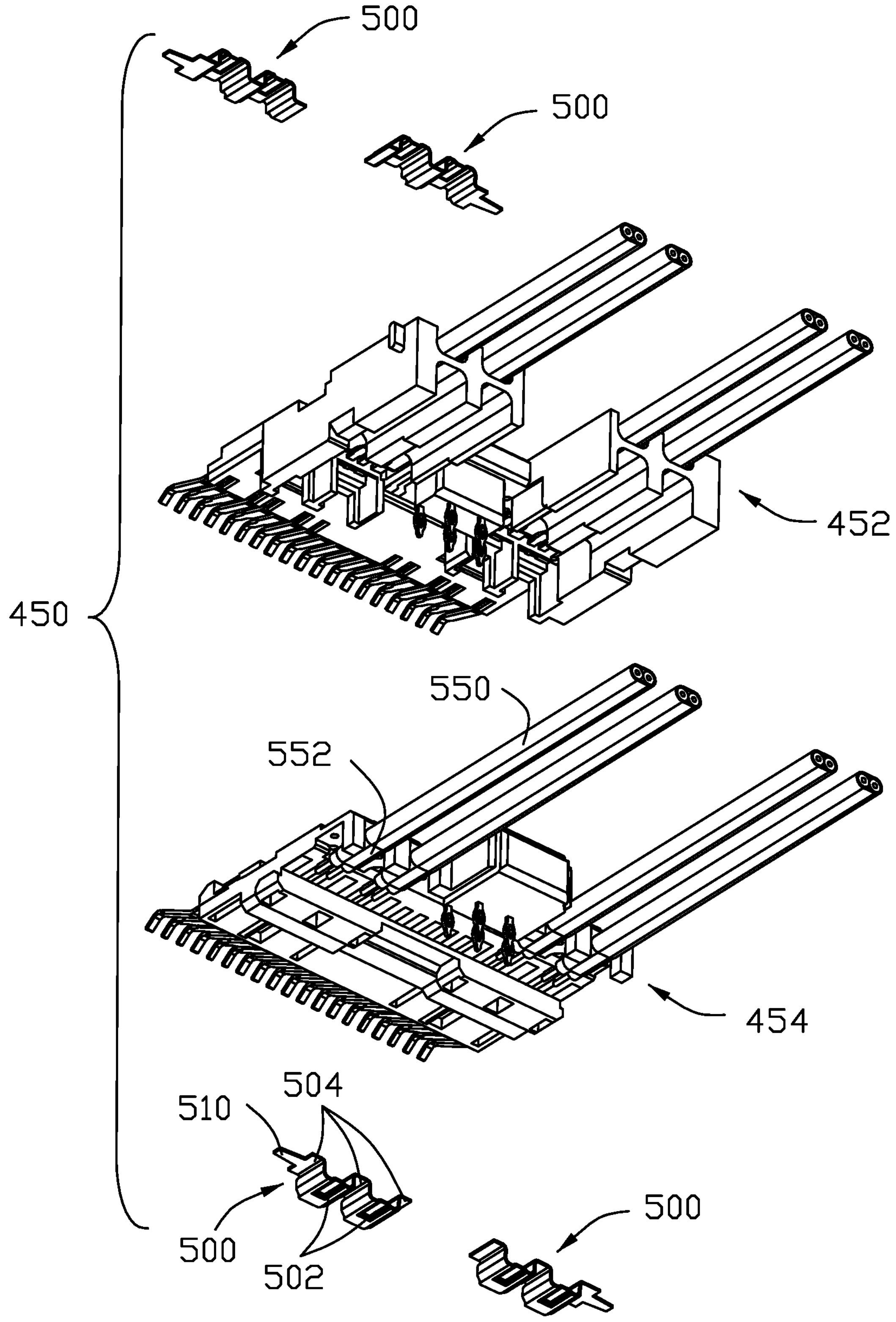
FIG. 21(B) is an exploded perspective view of the lower part of the contact module of the electrical connector assembly of FIG. 21(A)
Figure 22:
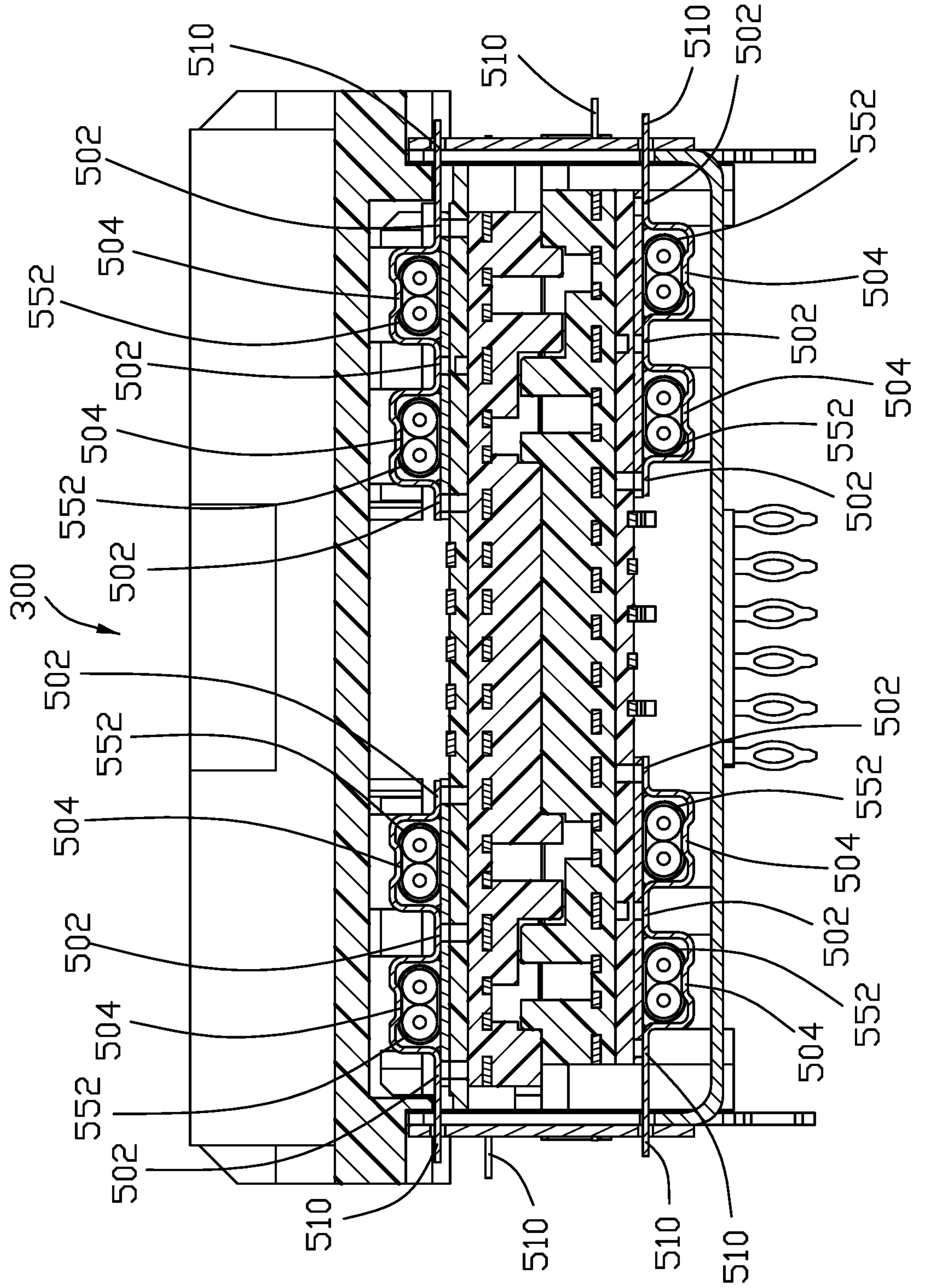
FIG. 22 is a cross-sectional view of the electrical connector assembly of FIG. 14 (A).

Notably, as shown in FIG. 13(E), the front edge of the grounding bracket 150 optimally extends beyond the front edge of the inner insulator 203 of the wire 200 for impedance and crosstalk control.

FIGS. 14(A)-22 disclose another embodiment of the invention wherein all structures are similar to those in the first embodiment except that the upper part and the lower part are assembled to each other by means that the grounding brackets extend through corresponding holes of a pair of metallic side plates so as to complete the whole contact module assembly.

The electrical connector assembly 300 includes a contact module 400 assembled within an insulative housing 310. The contact module 400 is essentially similar to the contact module 122 of the first embodiment, and includes an upper part 410 and the lower part 450. The upper part 410 includes a front/outer upper unit 412 and the rear/inner upper unit 414 stacked with each other in the vertical direction. Similar to the first embodiment, in the second embodiment, each unit 412, 414 includes a plurality of contacts (not labeled) integrally formed within an insulative body via insert molding and mechanically and electrically connected to the corresponding wires 550, respectively, or mounting to the printed circuit board. The contacts include the differential-pair contacts and the grounding contacts alternately arranged with each other. Similar to the grounding contacts disclosed in the first embodiment, in the second embodiment, the tail sections 420T of the grounding contacts are unified together at rear ends to form a transverse bar 422 which cooperates with the corresponding grounding bracket 500 to mechanically and electrically sandwich a braiding layer 552 of the wire 500 therebetween in the vertical direction. Similar to the grounding bracket 550 of the first embodiment, the grounding bracket 500 of the second embodiment includes three strap sections 502 and two bulged section 504 alternatively arranged with each other in the transverse direction wherein the bulged section 504 grasps the braiding layer 552. Different from the grounding bracket 150 of the first embodiment, in the second embodiment, an extension 510, as a feature of the second embodiment, extends from an outer end of the grounding bracket 500 in the transverse direction. Correspondingly, the lower part includes a front/outer lower unit 454 and the rear/inner lower unit 452 stacked with each other. Similar to the grounding bracket 500 disclosed in the upper part 410, the grounding bracket 500 of the lower part 450 also includes an extension 510 extending from the outer end in the transverse direction.

Different from the shield 190 of the first embodiment which is composed of the upper shell 192 and the lower shell 194, the metallic shield of the second embodiment includes a main shell 320 and a pair of side shells/plates 490 to assemble the upper part 410 and the lower part 450 together. The main shell 320 adapted to be upwardly assembled into the housing 310 after the contact module 400 is forwardly assembled into the housing 310, includes a U-shaped structure with retention tabs 322 retained within the corresponding holes 312 of the housing 310, a plurality of downwardly extending legs 328 for mounting to the printed circuit board, and a plurality of slots 324 for allowing the extensions 510 to extend therethrough, and a plurality of slots 326 to allow the corresponding protrusions (not labeled) formed on the insulative body of the rear/inner lower part 452 to extend therethrough. The side shells 490 are assembled upon the two opposite lateral sides of the insulative bodies of the contact module 400. Each side shell 490 forms a plurality of holes 492 to receive the corresponding extensions 510 to extending therethrough, and a hole 494 to receive the aforementioned corresponding protrusions formed on the insulative body of the rear/inner lower part 452. The solder material may be applied into the holes 492, 494 to mechanically and electrically connect the extensions 510 with the side shell 490 and the main shell 320.

After the side shells 490 are assembled upon the contact module 400, the extensions 510 are bent with ninety degrees to have the upper part 410 and the lower part 450 secured with each other via the corresponding side shells 490. The front contacting sections of the contacts extend into the front mating cavity of the housing 310.

What is claimed is:

1. An electrical connector assembly for mounting to a printed circuit board, comprising;

an insulative housing forming a front mating slot and a rear receiving space; and a contact module received within the receiving space and including:

an upper part and a lower part stacked with each other in a vertical direction;

the upper part including a front/outer upper unit and a rear/inner upper unit stacked with each other in the vertical direction;

the lower part including a front/outer lower unit and a rear/inner lower unit stacked with each other in the vertical direction;

each of said front/outer upper unit, said rear/inner upper unit, said front/outer lower unit, and said rear/inner lower unit including an insulative body and a plurality of contacts molded with the insulative body; wherein each of said front/outer upper unit, said rear/inner upper unit, said front/outer lower unit, and said rear/inner lower unit defines a middle side-band contact zone and a pair of differential-pair contact zones on two sides thereof; wherein the contacts in the middle side-band contact zone are directly mounted upon the printed circuit board while the contacts in the differential-pair contact zone are mechanically and electrically connected, respectively, to corresponding wires which extend rearwardly; wherein each of the front/outer upper unit, said rear/inner upper unit, said front/outer lower unit, and said rear/inner lower unit further includes a metallic grounding bracket to mechanically and electrically connect to a braiding layer of the corresponding wire; wherein the contacts in the differential-pair contact zone include a plurality of grounding contacts unified together with a transverse bar which cooperates with the corresponding grounding bracket to sandwich the corresponding braiding layer therebetween in the vertical direction; wherein the grounding bracket includes a plurality of extensions respectively pressing tail sections of the corresponding grounding contacts, respectively, and a plurality of solder termination pins mechanically and electrically connected to the transverse bar.

2. The electrical connector assembly as claimed in claim 1, wherein the grounding bracket and the transverse bar are soldered with the braiding layer.

3. The electrical connector assembly as claimed in claim 1, wherein the front edge of the grounding bracket extends beyond the front edge of the inner insulator of the wire for impedance and crosstalk control.

4. The electrical connector assembly as claimed in claim 1, wherein the grounding bracket comprises strap sections and bulged sections alternately arranged with each other in the transverse direction, and the extensions forwardly and obliquely extend from corresponding strap sections to mechanically and electrically connect the tail sections of the corresponding grounding contacts, respectively.

5. The electrical connector assembly as claimed in claim 4, wherein each strap section forms a hole through which a heat-stake on the insulator extends to be deformed to press the grounding bracket in position.

6. The electrical connector assembly as claimed in claim 5, wherein the bulged section forms a tab to compress the braiding layer of the corresponding wire.

7. The electrical connector assembly as claimed in claim 1, wherein the transverse bar is formed with a plurality of holes in alignment with the corresponding grounding contacts, respectively, in the front-to-back direction, the solder termination pins extend, in a vertical direction, from a rear end of the transverse bar and in alignment with the corresponding grounding contacts, respectively, in a front-to-back direction, and the solder termination pins of the grounding bracket extend into corresponding holes in the transverse bar in a soldering manner, respectively.

8. The electrical connector assembly as claimed in claim 1, wherein the upper part and the lower part are essentially arranged in a mirror image manner in the vertical direction, including the extension of the contacts and the stacking of the front/outer unit and the rear/inner unit, except the tail sections of the side-band contacts of both the upper part and the lower part extend downwardly instead of oppositely.

9. The electrical connector assembly as claimed in claim 1, further comprising a metallic shield comprising a pair of shields respectively assembled upon the upper part and the lower part.

10. The electrical connector assembly as claimed in claim 8, wherein each of the shields includes the spring tangs extending inwardly in the vertical direction to electrically and mechanically connect to the bulged sections of the corresponding grounding brackets for perfecting grounding, each of the shields further includes extending finger to contact the other to make common grounding.

11. The electrical connector assembly as claimed in claim 10, wherein the shields include engagement tabs to be received within the corresponding engagement holes of the housing so as to retain the contact module assembly within the housing.

12. The electrical connector assembly as claimed in claim 10, further comprising a pair of metallic mounting legs secured on two sides of the housing, and each of the mounting legs includes a spring finger to mechanically and electrically connect the corresponding extending finger of the shields for common ground consideration and a plurality of press-fit legs for mounting to the printed circuit board.

13. The electrical connector assembly as claimed in claim 1, wherein two rows of passageways are formed by two sides of the mating slot, and the front deflectable contacting sections of the contacts are received within the corresponding passageways, respectively, with the corresponding contacting points exposed in the mating slot which receives a mating tongue of the complementary connector.

14. The electrical connector assembly as claimed in claim 1, wherein the contacts in the differential-pair contact zone further include a plurality of differential-pair contacts alternately arranged with the corresponding grounding contacts, the insulative body forming a plurality of grooves to receive the tail sections of the differential-pair contacts and the inner conductors of the corresponding wires which are associatively soldered thereon, and a plurality of slots aligned with the corresponding grooves to receive the wires.

15. An electrical connector assembly for mounting to a printed circuit board, comprising;

- an insulative housing forming a front mating slot and a rear receiving space; and
- a contact module received within the receiving space and including:
  - an upper part and a lower part stacked with each other in a vertical direction;
  - each of said upper part and said lower part comprising an insulative body and a plurality of contacts integrally formed within the insulative body via an insert-molding process; wherein
- each of said upper part and said lower part defines a middle side-band contact zone, and a pair of differential-pair contact zones on two sides thereof; wherein
- the contacts in the middle side-band contact zone are directly mounted upon the printed circuit board while the contacts in the differential-pair contact zone are mechanically and electrically connected, respectively, to corresponding wires which extend rearwardly; wherein
- each of said upper part and said lower part comprise a metallic grounding bracket to mechanically and electrically connect to a braiding layer of the corresponding wire; wherein
- the contacts in the differential-pair contact zone include a plurality of grounding contacts unified together with a transverse bar which cooperates with the corresponding grounding bracket to sandwich the corresponding braiding layer therebetween in the vertical direction; wherein
- the grounding bracket includes a plurality of extensions respectively pressing tail sections of the corresponding grounding contacts, respectively and a plurality of solder termination pins mechanically and electrically connected to the transverse bar.

16. An electrical connector assembly for mounting to a printed circuit board, comprising;

- an insulative housing forming a front mating slot and a rear receiving space; and
- a contact module received within the receiving space and including:
  - an upper part and a lower part stacked with each other in a vertical direction;
  - the upper part including a front/outer upper unit and a rear/inner upper unit stacked with each other in the vertical direction;
  - the lower part including a front/outer lower unit and a rear/inner lower unit stacked with each other in the vertical direction;
  - each of said front/outer upper unit, said rear/inner upper unit, said front/outer lower unit, and said rear/inner lower unit including an insulative body and a plurality of contacts integrally formed within the insulative body via an insert-molding process; wherein
- each of said front/outer upper unit, said rear/inner upper unit, said front/outer lower unit, and said rear/inner lower unit defines a middle side-band contact zone and a pair of differential-pair contact zones on two sides thereof; wherein
- the contacts in the middle side-band contact zone are directly mounted upon the printed circuit board while the contacts in the differential-pair contact zone are mechanically and electrically connected, respectively, to corresponding wires which extend rearwardly; wherein
- each of said front/outer upper unit, said rear/inner upper unit, said front/outer lower unit, and said rear/inner lower unit further includes a metallic grounding bracket to mechanically and electrically connect to a braiding layer of the corresponding wire; wherein
- the contacts in the differential-pair contact zone include a plurality of grounding contacts unified together with a transverse bar which cooperates with the corresponding grounding bracket to sandwich the corresponding braiding layer therebetween in the vertical direction; wherein
- the grounding bracket further includes an extension extending from an outer end in a transverse direction; wherein
- a metallic side shell forms a plurality of holes through which the extensions extend to be bent so as to secure the upper part and the lower part together.

17. The electrical connector assembly as claimed in claim 16, further comprising a metallic main shell assembled upon the housing along a vertical direction after the contact module is forwardly assembled into the housing, and the main shell forms a plurality of vertical slots to allow the extensions to extend therethrough.

18. The electrical connector assembly as claimed in claim 17, wherein the extensions are bent ninety degrees.

19. The electrical connector assembly as claimed in claim 17, wherein the main shell includes a U-shaped structure with retention tabs retained within the corresponding holes of the housing, a plurality of downwardly extending legs for mounting to the printed circuit board, and a plurality of slots to allow the corresponding protrusions formed on the insulative body of the rear/inner lower part to extend therethrough.

20. The electrical connector assembly as claimed in claim 19, wherein the metallic side shell forms a hole to receive the corresponding protrusions formed on the insulative body of the rear/inner lower part.

* * * * *